US009092112B2

(12) United States Patent
Conway et al.

(10) Patent No.: US 9,092,112 B2
(45) Date of Patent: Jul. 28, 2015

(54) METHODS, APPARATUS AND DATA STRUCTURES FOR PROVIDING A USER INTERFACE TO OBJECTS, THE USER INTERFACE EXPLOITING SPATIAL MEMORY AND VISUALLY INDICATING AT LEAST ONE OBJECT PARAMETER

(75) Inventors: Matthew J. Conway, Seattle, WA (US); Stephen A. Jacquot, Charlottesville, VA (US); Dennis R. Proffitt, Earlysville, VA (US); George G. Robertson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1403 days.

(21) Appl. No.: 11/865,724

(22) Filed: Oct. 1, 2007

(65) Prior Publication Data

US 2008/0072168 A1 Mar. 20, 2008

Related U.S. Application Data

(63) Continuation of application No. 09/335,640, filed on Jun. 18, 1999, now Pat. No. 7,278,115.

(51) Int. Cl.
*G06F 3/048* (2013.01)
*G06F 3/0481* (2013.01)

(52) U.S. Cl.
CPC .................................. *G06F 3/04815* (2013.01)

(58) Field of Classification Search
CPC G06F 3/04815; G06F 3/04817; G06F 3/0481
USPC .......... 715/764–767, 782, 838, 848; 345/422
See application file for complete search history.

(56) References Cited

U.S. PATENT DOCUMENTS

| 4,965,840 | A | | 10/1990 | Subbarao | |
|---|---|---|---|---|---|
| 5,452,414 | A | * | 9/1995 | Rosendahl et al. | 715/836 |
| 5,669,006 | A | | 9/1997 | Joskowicz et al. | |
| 5,701,444 | A | * | 12/1997 | Baldwin | 345/506 |
| 5,880,733 | A | * | 3/1999 | Horvitz et al. | 715/850 |
| 5,920,313 | A | * | 7/1999 | Diedrichsen et al. | 715/767 |
| 6,088,032 | A | | 7/2000 | Mackinlay | |
| 6,121,969 | A | * | 9/2000 | Jain et al. | 715/850 |
| 6,160,553 | A | | 12/2000 | Robertson et al. | |
| 6,166,738 | A | | 12/2000 | Robertson et al. | |
| 6,188,405 | B1 | | 2/2001 | Czerwinski et al. | |
| 6,191,788 | B1 | * | 2/2001 | Fuller | 345/419 |
| 6,229,542 | B1 | * | 5/2001 | Miller | 715/782 |
| 6,243,091 | B1 | * | 6/2001 | Berstis | 715/839 |
| 6,253,218 | B1 | * | 6/2001 | Aoki et al. | 715/201 |
| 6,268,863 | B1 | | 7/2001 | Rioux | |
| 6,281,899 | B1 | * | 8/2001 | Gould et al. | 715/848 |

* cited by examiner

*Primary Examiner* — Amy Ng
*Assistant Examiner* — Sajeda Muhebbullah
(74) *Attorney, Agent, or Firm* — Heikki Einola; Judy Yee; Micky Minhas

(57) ABSTRACT

A graphical user interface in which object thumbnails are rendered in a three-dimensional environment and which exploits spatial memory. The objects may be moved, continuously, with a two-dimensional input device. Pop-up title bars may be rendered over active objects. Intelligent help may be provided to the user, as visual indicators, based on proximity clustering or based on matching algorithms. The simulated location of the object thumbnails in a direction orthogonal to the surface is based on function, such as a linear, polynomial, or exponential function for example, of one or more object properties, such as number of mouse clicks since selected, age, size, etc.

23 Claims, 25 Drawing Sheets

300

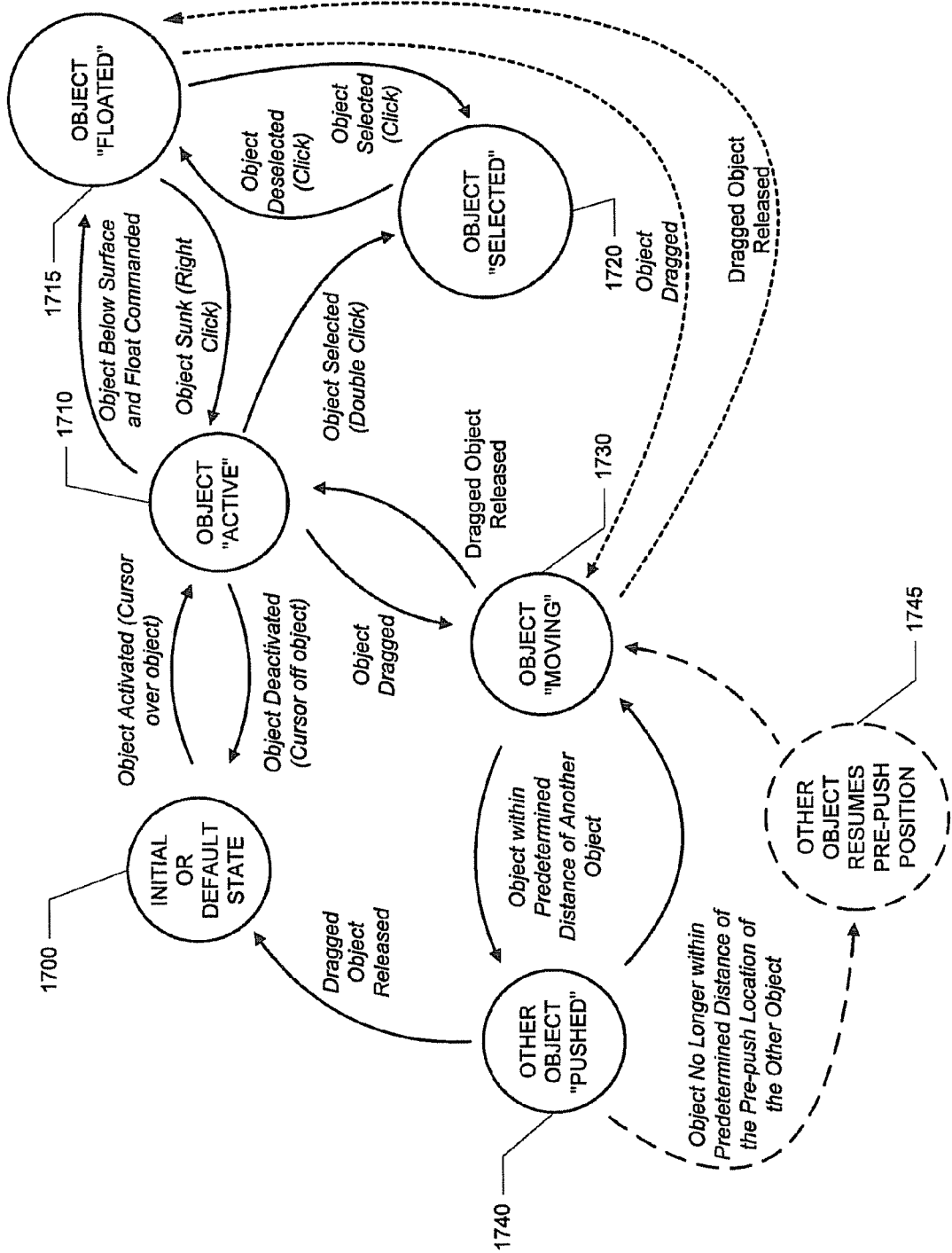

METHODS, APPARATUS AND DATA STRUCTURES FOR PROVIDING A USER INTERFACE TO OBJECTS, THE USER INTERFACE EXPLOITING SPATIAL MEMORY AND VISUALLY INDICATING AT LEAST ONE OBJECT PARAMETER

CROSS REFERENCE TO RELATED APPLICATIONS

This application is a Continuation of U.S. patent application Ser. No. 09/335,640, filed Jun. 18, 1999, entitled METHODS, APPARATUS AND DATA STRUCTURES FOR PROVIDING A USER INTERFACE TO OBJECTS, METHODS, APPARATUS AND DATA STRUCTURES FOR A USER INTERFACE TO OBJECTS, THE USER INTERFACE EXPLOITING SPATIAL MEMORY AND VISUALLY INDICATING AT LEAST ONE OBJECT PARAMETER, the entirety of which is incorporated herein by reference.

§1. BACKGROUND OF THE INVENTION

§1.1 Field of the Invention

The present invention concerns a user interface to objects, such as informational objects for example, which are stored on, or accessed via, a machine such as a computer for example. The present invention exploits the spatial memory of people and maps one or more parameters or properties of an object to a coordinate of a location of an object.

§1.2 Related Art

A brief history of user interfaces is provided below. First, known user interfaces are introduced in §1.2.1. Then, user interfaces which facilitate information access, rather than information processing, are introduced in §1.2.2. Finally, needs of users which have not yet been met by user interfaces are listed in §1.2.3.

§1.2.1 Known User Interfaces

The way in which people interact with computing machines has evolved over the last 50 or so years. Initially, these machines were typically used as information processors, and in particular, for performing mathematical operations on numbers. People interacted with such early computing machines by punching and ordering cards to effect a sequence of commands. In later computing machines, also typically used to perform mathematical operations on numbers, people interacted with such computing machines by setting switches and viewing light emitting diodes to enter commands. With the advent of the desktop personal computer, people-machine interaction evolved from the use a keyboard to enter lines of commands, discussed in §1.2.1.1 below, to the use of a keyboard and mouse to manipulate icon metaphors of the real world, discussed in §1.2.1.2 below.

§1.2.1.1 Command Lines

Early personal computers were also used to perform mathematical operations, from engineering applications to accounting applications (e.g., spreadsheets). In addition, such early personal computers were used to enter, store, and manipulate information, such as with word processing applications for example, and to effectively access stored information, such as with relational database applications for example. People typically interacted with such computers by entering commands, in accordance with fairly rigid syntactical rules, or by entering data via a keyboard and viewing results via a video monitor. Unfortunately, since the syntactical rules for interacting with a personal computer were typically not intuitive, people would have to invest a fairly substantial amount of time to master effective interaction with the computer. Until they mastered the syntactical rules, people would often become frustrated when using computers. Casual users would often conclude that learning to interact with computers would not be worth their time. Thus, computer use was usually limited to professionals (such as accountants, engineers, and scientists for example) who needed the computational power of personal computers, and to hobbyists.

§1.2.1.2 Graphical User Interfaces

The advent of graphical user interfaces (or "GUIs") provided a more intuitive way for people to interact with computers. The casual user no longer needed to learn syntactical rules and enter sequences of commands. As personal computers penetrated business to an ever greater degree, probably due to popular and time saving word processing and spreadsheet applications, operating systems began to employ user interfaces which used an office metaphor which included documents, folders, filing cabinets, trash cans, telephone directories, etc. These so-called desktop GUIs have served their users well over the past decade or so. However, in addition to using computers for data entry, storage, and manipulation, people are using computers for access to information to an ever increasing degree. This recent trend is discussed in §1.2.2 below.

§1.2.2 Migration from Information Processing and Desktop Metaphor to Information Access In recent decades, and in the past five (5) to ten (10) years in particular, computers have become interconnected by networks by an ever increasing extent; initially, via local area networks (or "LANs"), and more recently via LANs, private wide area networks (or "WANs") and the Internet. The proliferation of networks, in conjunction with the increased availability of inexpensive data storage means, has afforded computer users unprecedented access to a wealth of content. Such content may be presented to a user (or "rendered") in the form of text, images, audio, video, etc.

The Internet is one means of inter-networking local area networks and individual computers. The popularity of the Internet has exploded in recent years. Many feel that this explosive growth was fueled by the ability to link (e.g., via Hyper-text links) resources (e.g., World Wide Web pages) so that users could seamlessly transition from various resources, even when such resources were stored at geographically remote resource servers. More specifically, the Hyper-text markup language (or "HTML") permits documents to include hyper-text links. These hyper-text links, which are typically rendered in a text file as text in a different font or color, include network address information to related resources. More specifically, the hyper-text link has an associated uniform resource locator (or "URL") which is an Internet address at which the linked resource is located. When a user activates a hyper-text link, for example by clicking a mouse when a displayed cursor coincides with the text associated with the hyper-text link, the related resource is accessed, downloaded, and rendered to the user. The related resource may be accessed by the same resource server that provided the previously rendered resource, or may be accessed by a geographically remote resource server. Such transiting from resource to resource, by activating hyper-text links for example, is commonly referred to as "surfing".

Although people continue to use computers to enter information, manipulate information, and store information, in view of the foregoing developments people are using computers to access information to an ever increasing extent. In a departure from the past, the information people want to access is often not created by them (which would typically reside on the person's desktop computer), or even by a company or group to which that person belongs (which would typically reside on a storage server, accessible via a local area network). Rather, given the world wide breadth of the Internet, the information people want to access is usually created by unrelated third parties (or content providers). Unfortunately, GUIs using a desktop metaphor are not particularly well suited for such information access.

New GUIs should therefore help people find information that they want, or that they might want. Unfortunately, the very vastness of available data can overwhelm a user; desired data can become difficult to find and search heuristics employed to locate desired data often return unwanted data (also referred to as "noise").

Various concepts have been employed to help users locate desired data. In the context of the Internet for example, some services have organized content based on a hierarchy of categories. A user may then navigate through a series of hierarchical menus to find content that may be of interest to them. An example of such a service is the YAHOO™ World Wide Web site on the Internet. Unfortunately, content, in the form of Internet "web sites" for example, must be organized by the service and users must navigate through a predetermined hierarchy of menus. If a user mistakenly believes that a category will be of interest or include what they were looking for, but the category turns out to be irrelevant, the user must backtrack through one or more hierarchical levels of categories.

Again in the context of the Internet for example, some services provide "search engines" which search databased content or "web sites" pursuant to a user query. In response to a user's query, a rank ordered list, which includes brief descriptions of the uncovered content, as well as a hypertext links (text, having associated Internet address information, which, when activated, commands a computer to retrieve content from the associated Internet address) to the uncovered content is returned. The rank ordering of the list is typically based on a match between words appearing in the query and words appearing in the content. Unfortunately, however, present limitations of search heuristics often cause irrelevant content (or "noise") to be returned in response to a query. Again, unfortunately, the very wealth of available content impairs the efficacy of these search engines since it is difficult to separate irrelevant content from relevant content.

The foregoing means permit users to find content of interest to them, or to deliver content that may be of interest to a user. Unfortunately, neither of the foregoing means is particularly well suited when the user wants to "go back" to (or "relocate") information (or content), to revisit that information or to revisit a familiar content provider to view new information (or content). More specifically, a person typically does not want to go through steps of navigating through a hierarchy of menus, or entering a search query to get to favored content or favored content providers.

§1.2.2.1 Information Access User Interfaces and their Limitations

In view of the shift towards using computers to access information, a number of user interfaces have been developed to help people revisit or relocate information or content providers. A sample of these user interfaces, as well as perceived limitations of such user interfaces, is presented below.

§1.2.2.1.1 Bookmarks and Favorites Lists

Some so-called "Internet browser" program services, such as Microsoft's Internet Explorer™ for example, permit people to create lists of favorite Internet locations (as located by a Uniform Resource Locator or "URL") represented by bookmarks. Unfortunately, as the number of bookmarks in a list increases, a person's ability to find a desired bookmark becomes more difficult. Although people can arrange and organize such lists of bookmarks into hierarchies, this requires some effort (mental effort is also referred to as "cognitive load") to organize and maintain the hierarchy. Moreover, the use of hierarchies does not fully exploit the spatial memory (This concept has also been referred to as "where it is what it is".) of people. Finally, other than textual information regarding the information, such as a title of a web page for example, the bookmarks do not provide the user with any other information about the information.

§1.2.2.1.2 Web Book/Web Forager

The article, Card, et al., "The WebBook and Web Forager: An Information Workspace for the World-Wide Web," *Proceedings of CHI '96*, pp. 111-117 (Apr. 13-18, 1996) (hereafter referred to as "the WebBook article") also recognized the trend towards the use of computers for information access. Focusing on the use of the Internet, the WebBook article noted, among other things, that web pages are often hard to find, users get lost and have difficulty relocating pages, and users have difficulty organizing found pages. The article then discussed a WebBook™ which simulates, in three dimensions, a physical book and includes pages, each of which correspond to a web page. Hypertext links are color coded to indicate whether the referenced web page is within the currently opened book or not. If the web page referenced by the link is in the book, activating the hypertext link will effect an animation of flipping pages to the desired web page. If the web page referenced by the link is not in the book, activating the hypertext link will close the currently opened WebBook and, if the web page is in another WebBook on a simulated bookshelf, will open that WebBook to the selected web page. The user can flip or ruffle through the pages of the WebBook using various input techniques. Portions of interest on a web page may be inspected with panning and zooming operations. The Document Lens feature described in the WebBook article is related to U.S. Pat. No. 5,670,984 to Robertson (incorporated herein by reference).

Although the WebBook uses screen space efficiently and uses a familiar metaphor, it has a number of limitations. First, the book metaphor limits the number of web pages that can be seen at one time—most pages are totally occluded. Second, the book metaphor does not exploit spatial memory. That is, it is believed that user will only remember the ordered pages in a linear (or one-dimensional) manner. Finally, the WebBook does not convey any information about the properties of the information or content.

The WebBook article also discusses a Web Forager which embeds the WebBook and other objects in a hierarchical three-dimensional workspace. The workspace includes four (4) hierarchical levels; namely a focus place, an immediate memory space, a secondary storage area, and a tertiary storage area. In the focus place, objects are rendered in full size and can be acted upon by the user. The immediate memory space uses the metaphor of a desk top. The secondary storage area uses several tiers in Z space, in which objects can be moved. Finally the tertiary storage area uses a bookshelf metaphor. A book selected from the bookshelf will come up to the focus place and an object then in the focus place will be moved into the secondary memory space.

Although the Web Forager exploits, at least to some extent, spatial memory, particularly in the secondary storage area, the interaction between the focus place, immediate memory place, secondary storage area, and tertiary storage area may not be immediately obvious to new users. Further, if more than about 30 objects are placed in the secondary storage place, objects may become occluded. Finally, the use of tiers in the Z dimension of the secondary storage place limits the exploitation of a user's spatial memory.

§1.2.2.1.3 Workscape

Noting the concept of "what it is where it is", the article, Ballay, "Designing Workscape™: An Interdisciplinary Experience", *Human Factors in Computing Systems, CHI '94*, pp. 10-15 (April 1994) (hereafter referred to as "the Workscape article"), discusses a three-dimensional user interface for managing documents.

As discussed at the web page on the Internet at http://www.maya.com/Portfolio/workscape.html (downloaded Jul. 7, 1998, revised 1998), Workscape permits users to drag documents in the X-Y plane, and also push and pull documents in the Z dimension.

Although Workscape exploits spatial memory, it is apparently not concerned with the problem of object occlusion. Furthermore, it is believed that separate user operations for (i) dragging an object in the X-Y plane, and (ii) pushing and pulling documents in the Z dimension, will be cumbersome for users in practice. Finally, the location of the object does not provide a user with any information about any properties of the object.

§1.2.2.1.4 Mapa

The product MAPA, offered by Dynamic Diagrams of Providence, R.I., uses a three-dimensional display to show the organization of web pages at a web site. As a web page is selected, its children in the web site hierarchy are displayed. The pages are represented by sheets. As a user's cursor hovers over a page, a pop-up title is provided. Although MAPA may be useful for visualizing large amounts of hierarchical data, it lends itself to a predetermined hierarchies (i.e., web pages of a web site). That is, it is believed that the strength of MAPA is presenting information, not building or updating hierarchies of information.

§1.2.2.1.5 MacIntosh and Windows NT® Operating Systems

Some versions of the MacIntosh and Windows NT® Operating Systems permit users to arrange, using a mouse drag operation for example, icons on a two-dimensional surface rendered on the screen of a video monitor. Drag feedback is provided. The user's arrangement of the icons persists. However, the icons represent applications or files or directories—they are not miniature images, or thumbnails, of objects. Further, the location of the icon does not relay any information regarding any of its properties, unless the user intentionally arranges the icons in such a manner.

§1.2.2.1.6 Windows NT® 5.0

A file manager or windows explorer feature of Windows NT® 5.0 may be configured to display document or file thumbnails in a selected directory. Each thumbnail includes a title which persists (i.e., is continuously rendered). A user can rearrange these thumbnails on a display screen, for example, by using a mouse drag operation. However, no drag feedback is provided.

Furthermore, the user arrangement of the thumbnails does not persist. That is, when the selected directory is left and then reentered, the thumbnails are arranged in a default manner, not based on a previously entered user arrangement. Further, the location of the thumbnail does not relay any information regarding any of its properties, unless the user intentionally arranges the thumbnails in such a manner.

§1.2.2.1.7 InfoGrid

The article: R. Rao, S. K. Card, H. D. Jellinek, J. D. Mackinlay, and G. G. Robertson, "The Information Grid: A Framework for Information Retrieval and Retrieval-Centered Applications," *UIST '92*, pp. 23-32 (Nov. 15-18, 1992) (hereafter referred to as "the InfoGrid article") discusses a user interface for object (e.g., document) retrieval. The InfoGrid display layout includes (i) an area for entering search parameters, (ii) a control panel which includes tool buttons, (iii) a area for rendering thumbnails of objects returned from a search, (iv) an area to hold selected objects, (v) an area for depicting a search path, and (vi) an area for depicting a document and its properties. The InfoGrid does not exploit a user's spatial memory and, in fact, teaches away from using location-centric workspace retrieval. (See page 31 of the InfoGrid article.) Instead, the InfoGrid permits a user to specify an initial query by providing values for various fields in a search parameter area, after which objects may be retrieved using an iterative process. (See page 26 of the InfoGrid article.)

§1.2.2.1.8 Data Mountain

U.S. patent application Ser. No. 09/152,491 entitled "Methods, Apparatus, and Data Structures for Providing a User Interface, which Exploits Spatial Memory in Three-Dimensions, to Objects" and filed on Sep. 14, 1998 discloses a user interface in which objects, represented by thumbnails, may be positioned on a simulated three-dimensional surface. However, the position of the thumbnails on the three-dimensional surface does not necessarily convey any information about the object—the user is free to position the object in the simulated three-dimensional space. It is to be understood, however, that the user may position object thumbnails in accordance with some purposeful, or unconscious, scheme.

§1.2.3 Unmet Needs

As discussed above, there exists a need for a user interface, and in particular a graphical user interface, to information or content. Such a user interface should exploit spatial memory. For example, the user interface should permit continuous movement in the simulated space. The user interface should also be intuitive to minimize the time needed for a user to become familiar with it. For example, the user interface should not be cumbersome or require too many different types of inputs to manipulate objects. The user interface should convey, at minimal cognitive load to the user, properties or parameters of the information to the user. Finally, the user interface should provide intelligent help to the user.

§2. SUMMARY OF THE INVENTION

The present invention may represent, visually, objects (such as a document, a spread sheet, a business contact, a drawing, a picture or image, a web page, a resource location or directory, etc., or a representation thereof, for example) or content with a low resolution scaled image (such as, a 64 pixel by 64 pixel bit map having 24 bit color for example) which can be added, moved, or deleted from a display rendered on a video monitor. The present invention may use pop-up title bars (or other descriptive textual information) for permitting a user to discern more about the object represented by a low resolution image. The present invention may use higher resolution image (such as a 512 pixel by 512 pixel bit map having 24 bit color for example) representations of objects, or "live" objects loaded within an associated application, for editing or otherwise working on a selected object. Other visual representations of objects may be used. Any and all visual representations of objects may be referred to as "thumbnails" in the following.

The present invention may render a two-dimensional surface (or layer) on which the object thumbnails may be manipulated. The two-dimensional surface upon which an object may be manipulated may be the surface of a simulated three-dimensional tank (also referred to as a "data tank").

The present invention may map values of properties or parameters of the object information to a depth. Using this depth information, the present invention renders the thumbnail of the information object in the simulated three-dimensional tank at a simulated depth. As the values of properties or parameters of the objects change, the simulated depth at which they are rendered may change.

The present invention may use inputs from a familiar input device such as a mouse or pointer to manipulate the object thumbnails. The present invention may also prevent any one object thumbnail (or landscape feature) from totally occluding another object thumbnail so that neither is (totally) hidden from the user.

Finally, the present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user. If so, the present invention may employ some type of visual indication, such as a colored halo around thumbnails of related objects for example, of related objects. This visual indication may be rendered continuously or, alternatively, upon an event, such as when an object thumbnail is made "active".

§3. BRIEF DESCRIPTION OF THE DRAWINGS

FIG. 1 is a personal computer on which the user interface of the present invention may be effected.

FIG. 2A is a high level diagram of processes and stored data which may be used to effect the user interface of the present invention. FIG. 2B is a diagram of processes which may be related to an input management process of FIG. 2A. FIG. 2C is a diagram of processes which may be related to a state update management process of FIG. 2A. FIG. 2D is a diagram of processes which may be related to a special services management process of FIG. 2A. FIG. 2E is a diagram of processes which may be related to an output management process of FIG. 2A.

FIG. 17 is a diagram of states and state transitions which the user interface of the present invention may use.

§4. DETAILED DESCRIPTION

Figure 1:
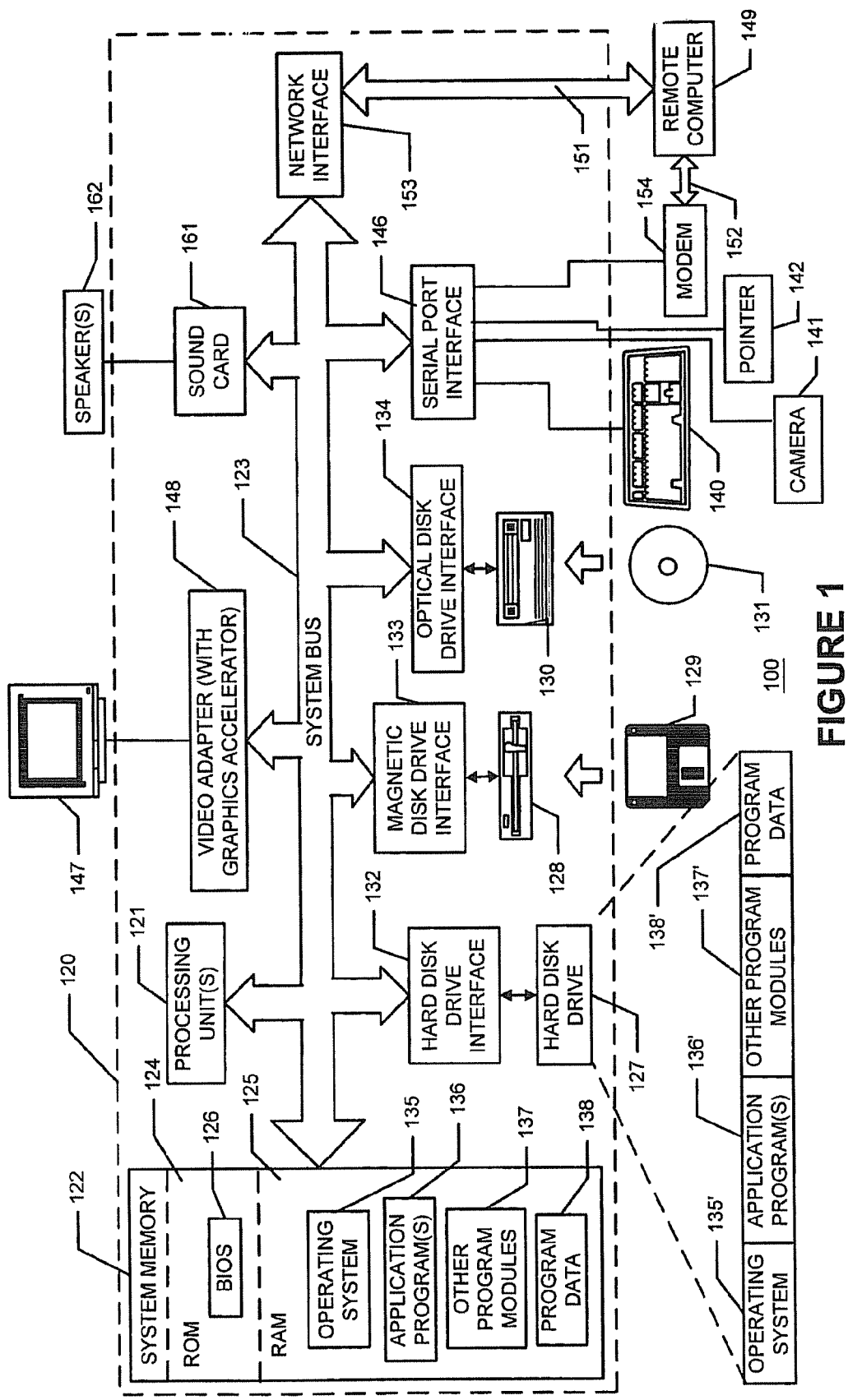

The present invention concerns novel methods, apparatus and data structures for providing a user interface. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

Features of, and functions which may be performed by, the present invention, will first be described in §4.1 below. Then, structures, processes, data structures, methods and displays of exemplary embodiments of the present invention will be described in §4.2 below.

§4.1 Functions which May be Performed by the Present Invention

Recall from §1.2.3 above, that there exists a need for a user interface, and in particular a graphical user interface, to information or content (also referred to as an "object"). A user should be able to view and organize all objects and to edit or otherwise work on a selected object. To achieve these goals, the present invention may represent, visually, objects (such as a document, a spread sheet, a business contact, a drawing, a picture or image, a web page, a resource location or directory, etc., or a representation thereof, for example) or content with a low resolution scaled image (such as, a 64 pixel by 64 pixel bit map having 24 bit color for example) which can be added, moved, or deleted from a display rendered on a video monitor. The present invention may use pop-up title bars (or other descriptive textual information) for permitting a user to discern more about the object represented by a low resolution image. The present invention may use higher resolution image (such as a 512 pixel by 512 pixel bit map having 24 bit color for example) representations of objects, or "live" objects loaded within an associated application, for editing or otherwise working on a selected object. Other visual representations of objects may be used. Any and all visual representations of objects may be referred to as "thumbnails" in the following.

Recall also from §1.2.3 above, that a user interface should exploit spatial memory. To achieve this goal, the present invention may render a two-dimensional surface (or layer) on which the object thumbnails may be manipulated. The two-dimensional surface upon which an object may be manipulated may be the surface of a simulated three-dimensional tank (also referred to as a "data tank").

Recall also from §1.2.3 above that a user interface should convey, at minimal cognitive load to the user, properties or parameters of the information to the user. To achieve this goal, the present invention may map values of properties or parameters of the object information to a depth. Using this depth information, the present invention renders the thumbnail of the information object in the simulated three-dimensional tank at a simulated depth. As the values of properties or parameters of the objects change, the simulated depth at which they are rendered may change.

Recall further from §1.2.3 above that a user interface should also be intuitive to minimize the time needed for a user to become familiar with it. For example, the user interface should not be cumbersome, nor should it require too many different types of inputs to manipulate the object thumbnails. To achieve this goal, the present invention may use inputs from a familiar input device such as a mouse or pointer to manipulate the object thumbnails. The present invention may also prevent any one object thumbnail (or landscape feature) from totally occluding another object thumbnail so that neither is (totally) hidden from the user.

Recall finally from §1.2.3 above, that the user interface should provide intelligent help to the user. The present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user. If so, the present invention may employ some type of visual indication, such as a colored halo around thumbnails of related objects for example, of related objects. This visual indication may be rendered continuously or, alternatively, upon an event, such as when an object thumbnail is made "active".

Having described functions which may be performed by the present invention, structures, processes, methodologies, data structures and displays which may be used by the present invention are now described in §4.2.

§4.2 Structures, Processes, Methodologies, Data Structures, and Displays which May be Used By the Present Invention In the following, exemplary systems on which the present invention may operate are described in §4.2.1 with reference to FIGS. 1A and 1B, exemplary displays which may be generated by the present invention are described in §4.2.2 with reference to FIGS. 9 through 12, and exemplary processes, methods and data structures which may be used to effect certain aspects of the present invention are described in §4.2.3 with reference to FIGS. 2A through 8 and 13 through 21.

Figure 22:
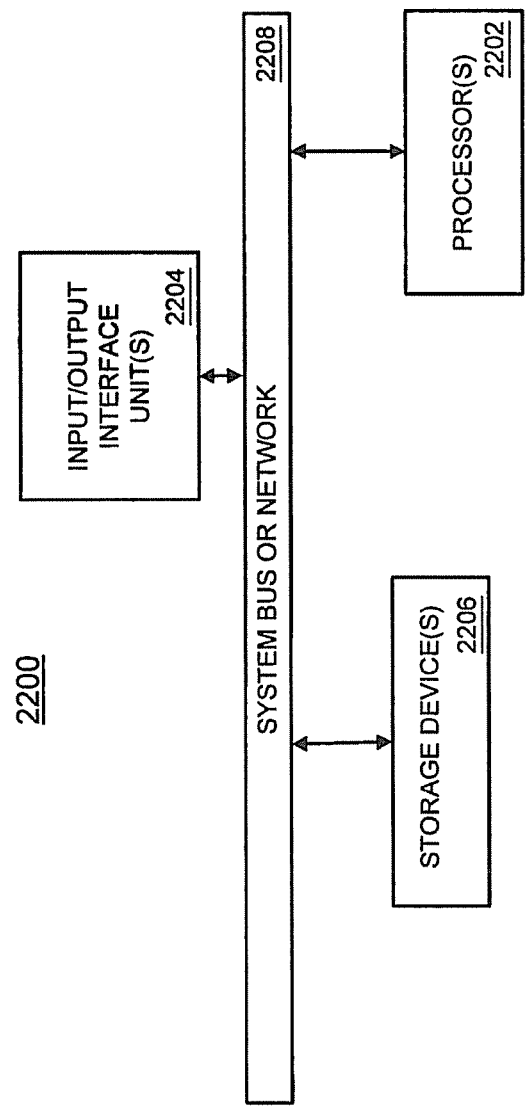
FIG. 22 is a machine on which the user interface of the present invention may be effected.

§4.2.1 Exemplary Systems (FIGS. 1 and 22)

FIG. 1 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 1, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows NT® 4.0, sold by Microsoft Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, or the like may also be included. These and other input devices are often connected to the processing unit 121 through a serial port interface 146 coupled to the system bus. However, input devices may be connected by other interfaces, such as a parallel port, a game port or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment which defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1A. The logical connections depicted in FIG. 1A include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152. The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

FIG. 22 is a more general machine 2200 which may effect one or more of the processes discussed above. The machine 2200 basically includes a processor(s) 2202, an input/output interface unit(s) 2204, a storage device(s) 2206, and a system bus or network 2208 for facilitating data and control communications among the coupled elements. The processor(s) 2202 may execute machine-executable instructions to effect one or more aspects of the present invention. At least a portion of the machine executable instructions and data structures may be stored (temporarily or more permanently) on the storage devices 2206 and/or may be received from an external source via an input interface unit 2204.

§4.2.2 Exemplary Displays (FIGS. 9-11B)

Figure 9:
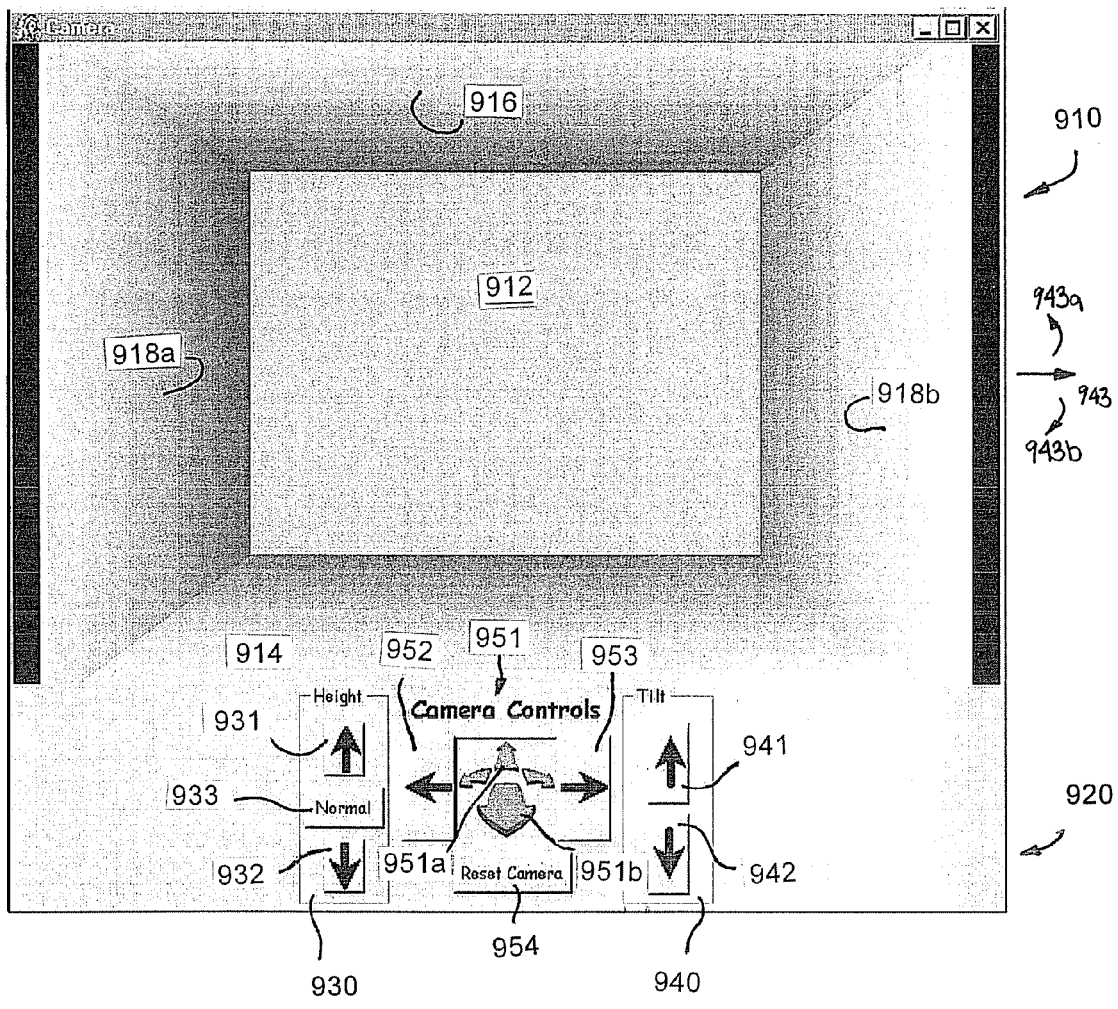
FIG. 9 is an exemplary display of an output of the user interface of the present invention.

As discussed in §4.1 above, present invention may represent, visually, objects using object thumbnails. These thumbnails may be manipulated on a two-dimensional surface and may have a simulated depth based on values of properties or parameters of the object. FIG. 9 is a display 900 which illustrates the data tank metaphor user interface of the present invention. Basically, the display 900 includes an object manipulation and display field 910 and a view point control panel 920. Like a glass-walled tank, the object manipulation and display field 910 includes a bottom 912, a front wall 914, a rear wall 916, and side walls 918*a* and 918*b*. An equally valid metaphor is that of looking into a room (not a glass-walled tank) which includes a back wall 912, a floor 914, a ceiling 916 and side walls 918*a* and 918*b*. The front wall is transparent, giving the entire mechanism the visual appearance of a stage or a proscenium.

The control panel 920 includes buttons, which may be actuated using a pointing device, such as a mouse for example. The height control sub-panel 930 permits the user's viewing point to move up-and-down in directions perpendicular to the surface of the tank. Button 931 moves the viewing point up (the tank will appear to move lower on the screen) and button 932 moves the viewing point lower (making the tank move appear to move higher). Button 933 will return the viewing point to a "home" position, such as the top surface of the tank for example. A tilt control sub-panel 940 permits a user's viewing point be rotated about a tilt axis 943, in direction 943*a* using button 942, or in direction 943*b* using button 941. Buttons 952 and 953 permit a user's viewing point to be translated left and right, respectively. Panel 951 permits a user's viewing point to be moved forward and rearward, (for example, assuming that there has been no net rotation about the tilt axis 943, toward the bottom of the tank and toward the top surface of the tank, respectively) or turned from one side to the other in a motion similar to camera pan on a standard camera tripod.

The height button 932 or (assuming that there has been no net rotation about the tilt axis 943) the forward button 951*a* of panel 951 allows the user's viewing point to descend into the (also referred to as "diving") while the height button 931 or (assuming that there has been no net rotation about the tilt axis 943) the backward button 951*b* of panel 951 permits the user's viewing point to ascend to the surface again. For example, referring to FIG. 12, the viewing point is located in front of the front wall 914 of the tank and to the right of the right wall 918*b* of the tank. Finally, a reset camera button 954 may be used to return a user's viewing point to a home position, such as centered between the side walls 918*a*, 918*b* and located over the top surface of the tank, as shown in FIG. 9, with no rotation about the tilt axis 943. In an alternative embodiment, "diving" may be effected in response to a mouse click on an visible part of the tank and a drag on the y-axis (depth). Similarly, different parts of the tank (e.g., floor, walls, etc.) can be grabbed and dragged along different axes to change the viewing point location.

Figure 10A:
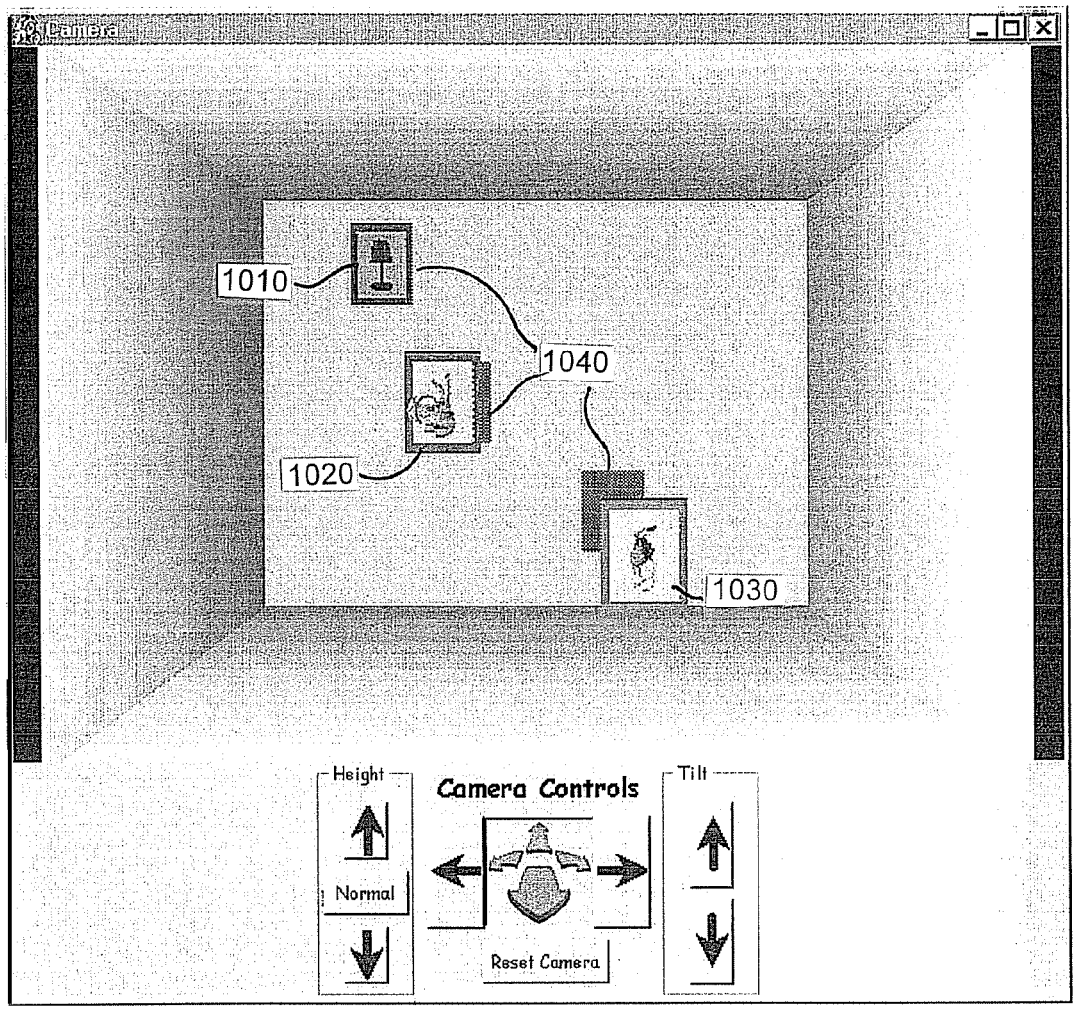
FIGS. 10A through 10C depict a sequence of exemplary displays which show the affects of selecting objects in the user interface of the present invention.
Figure 10B:
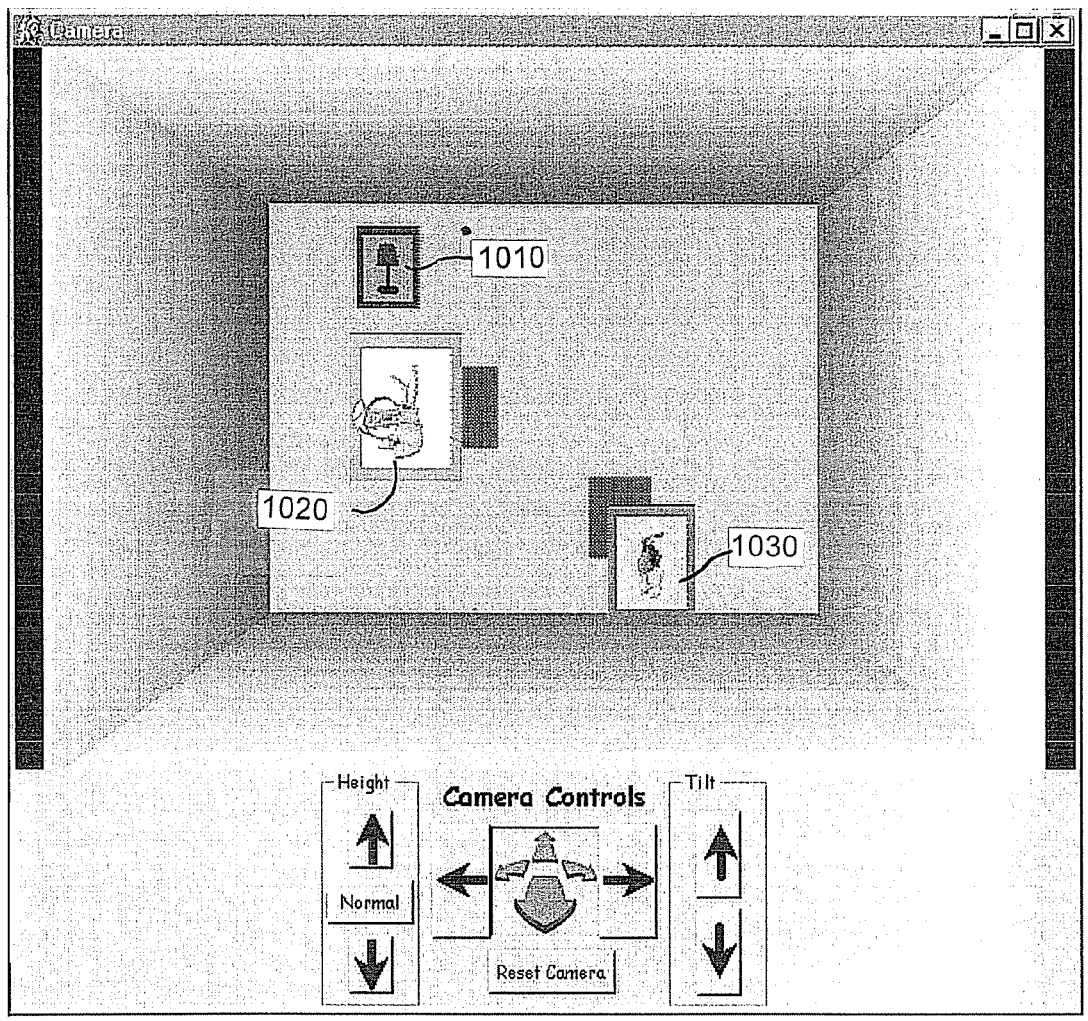
Figure 10C:
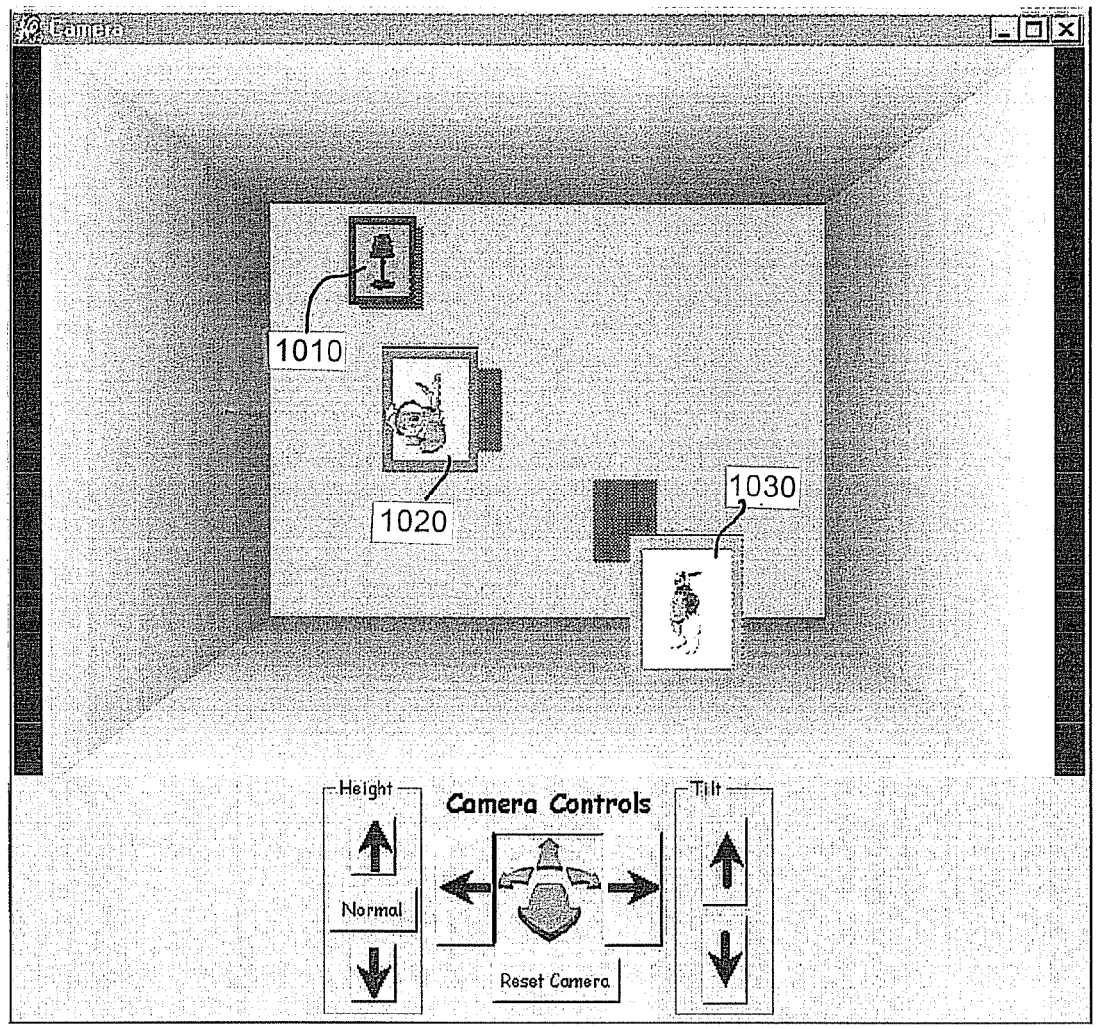

FIGS. 10A through 10C depict a sequence of exemplary displays which show the affects of "floating" objects in the user interface of the present invention. Referring first to the display 1000 of FIG. 10A, notice that three (3) thumbnails 1010, 1020, and 1030 are provided in the data tank. Notice that each of the thumbnails may project a shadow 1040 onto the floor 912 of the tank. Notice also that as the depth of the thumbnails increases, the thumbnails may be increasingly shaded or faded out. Specifically, in the exemplary display shown, the thumbnails are being tinted toward the blue end of the spectrum using the fog-rendering capabilities of the 3D graphics system. Finally, notice that the perceived sizes of the thumbnails are different since they are rendered from the perspective of the viewing point which, in this case, is centered above the tank.

The scene is rendered in a 3D perspective projection; objects further away from the view point appear (are rendered) smaller on the screen. This is in contrast to parallel projection 3D graphics systems in which objects do not get smaller with distance. The present invention could use parallel projection. However, if perspective projection is not used, the user loses an important depth cue.

In display 1000' of FIG. 10B, the thumbnail 1020 has been "floated" (for example, by left clicking a mouse button when a mouse controlled cursor is over the thumbnail 1020). Thus, this thumbnail 1020 is brought to the surface of the tank where it can be moved, using traditional "drag and drop" inputs for example. Notice that since this thumbnail 1020 is now at the surface of the tank, it is not shaded or faded.

In display 1000" of FIG. 10C, the thumbnail 1030 has been "floated" (for example, by left clicking a mouse button when a mouse controlled cursor is over the thumbnail 1030). Thus, this thumbnail 1030 is brought to the surface of the tank where it can be moved, using traditional "drag and drop" inputs for example. Notice that since this thumbnail 1030 is now at the surface of the tank, it is not shaded or faded. Notice also that the thumbnail 1020, which was previously on the surface of the tank in display 1000' of FIG. 10b, has started to "sink" in the tank. In this case, the depth may be a linear function of the number of mouse clicks since the thumbnail was last "floated".

Recall that the button 932 or (assuming that there has been no net rotation about tilt axis 943) the forward button 951a of the panel 951 permits a user's viewing point to descend into the tank (also referred to as "diving"), and that the button 931 or (assuming that there has been no net rotation about tilt axis 943) the backward button 951b of the panel 951 allows the viewing point to ascend within the tank. Button 933 allows the viewpoint to instantaneously return to a home viewing point, such as viewing the top surface of the tank.

Figure 11A:
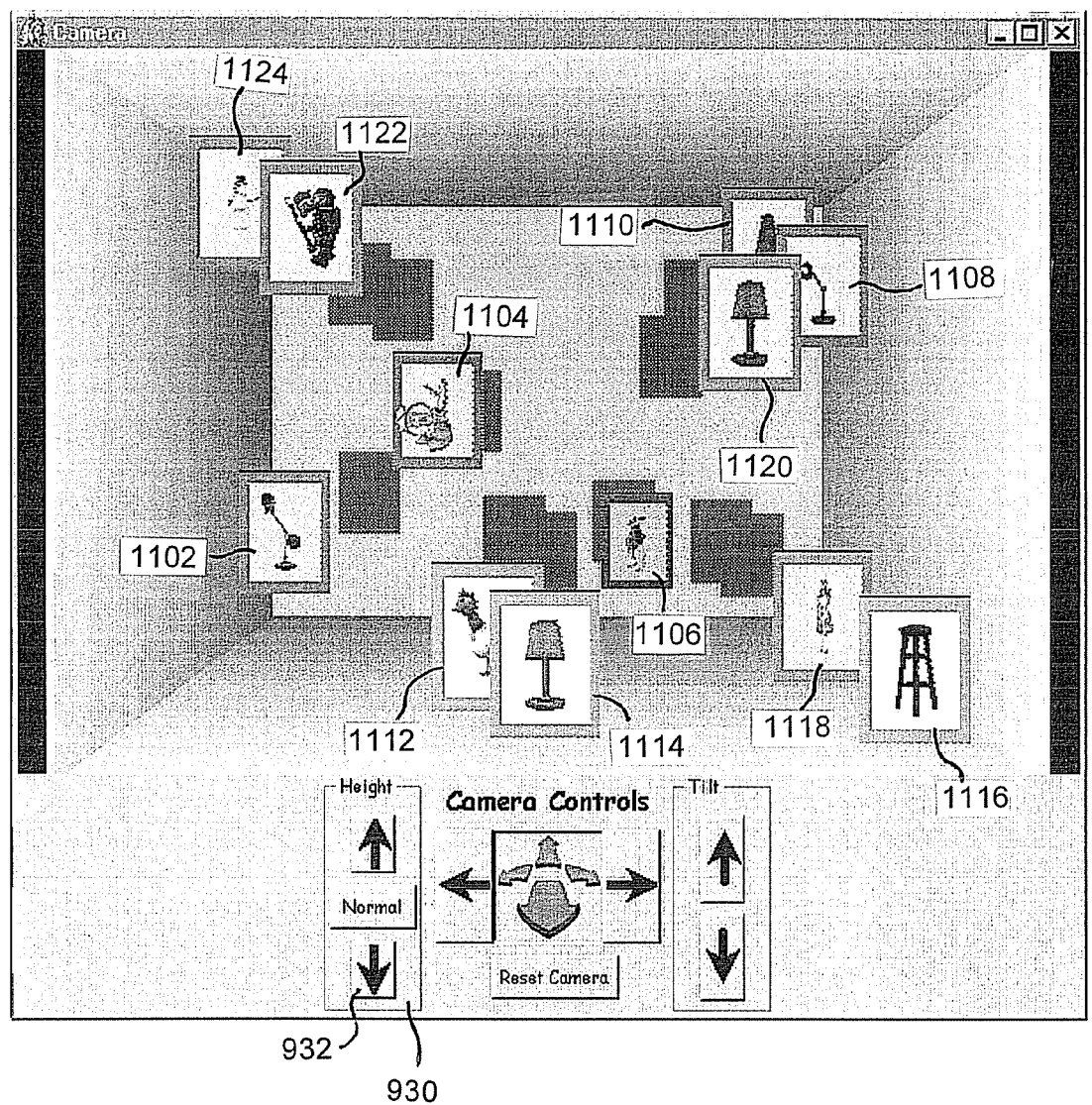
FIGS. 11A and 11B depict a sequence of exemplary displays which show a "diving" feature which may be provided by the user interface of the present invention.
Figure 11B:
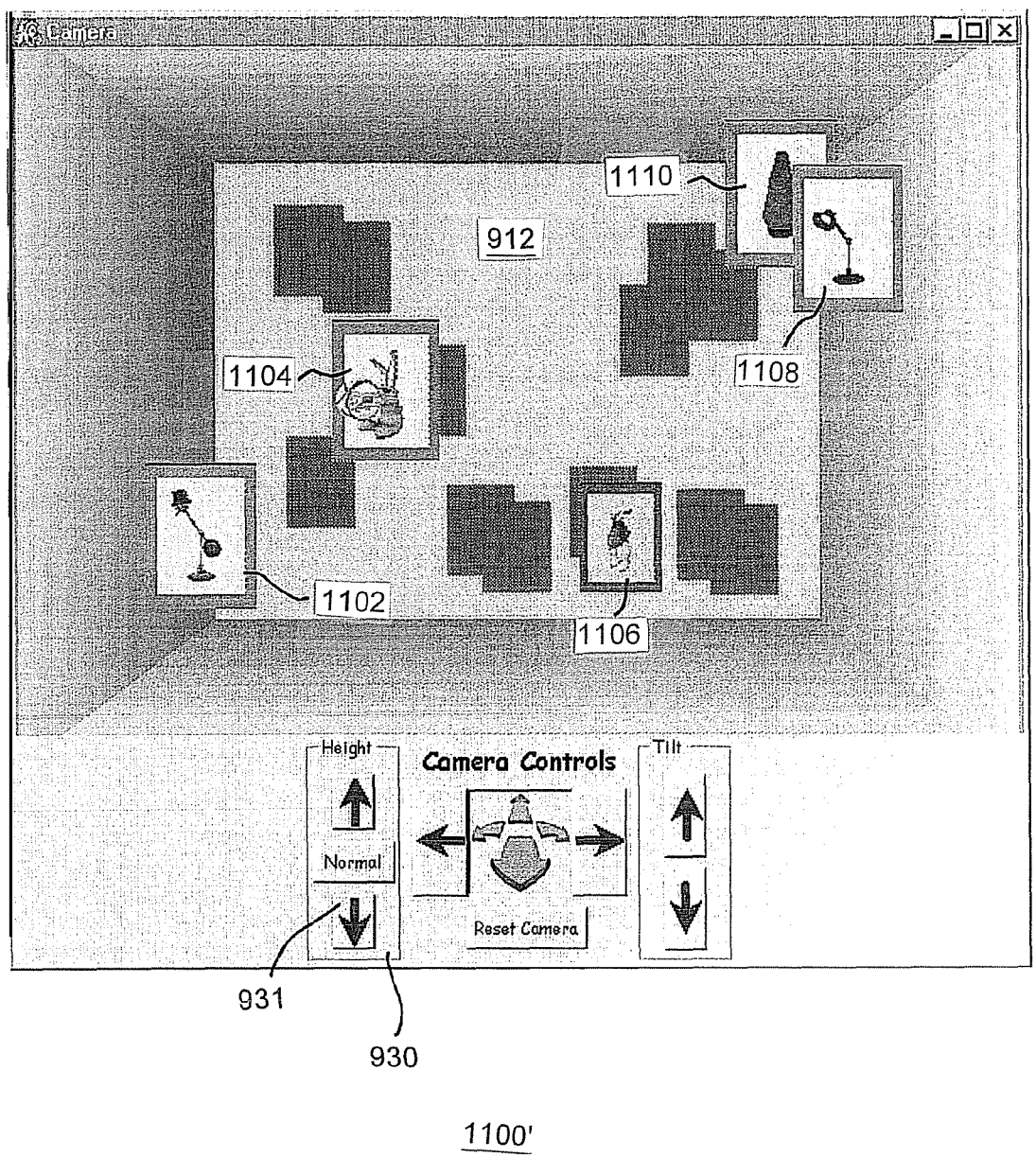
Figure 12:
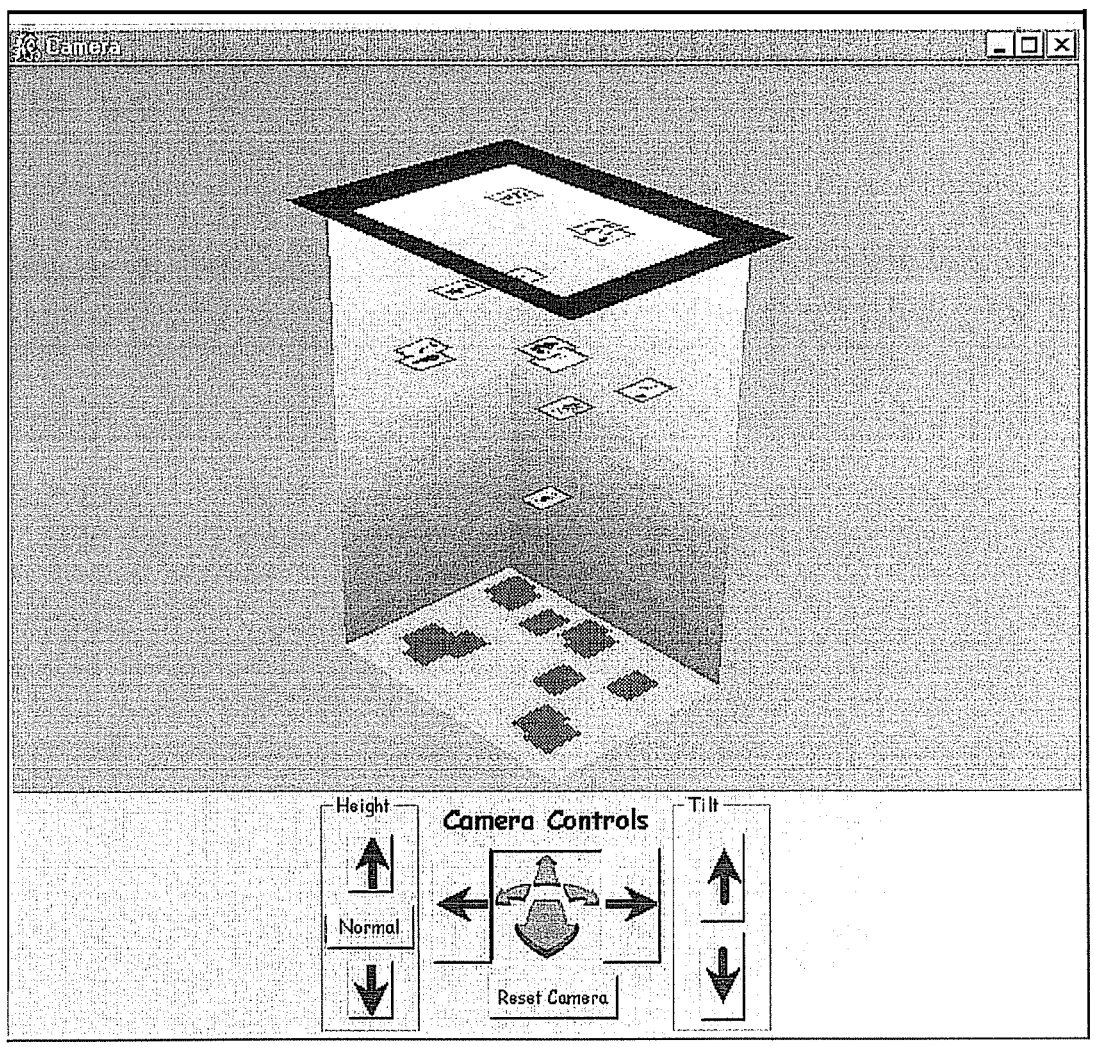
FIG. 12 is an exemplary display of an output of the user interface of the present invention with a non-plan viewing point.

FIGS. 11A and 11B depict a sequence of exemplary displays which show a viewing point descent (or "diving") feature which may be provided by the user interface of the present invention.

Referring first to FIG. 11A, a display 1100 includes a tank having a number of thumbnails 1102, 1104, 1106, 1108, 1110, 1112, 1114, 1116, 1118, 1120, 1122, and 1124. As was the case with the displays of FIGS. 10A through 10C above, notice that (i) each of the thumbnails may project a shadow onto the floor 912 of the tank, (ii) as the depth of the thumbnails increases, the thumbnails may be increasingly shaded or faded out, and (iii) the perceived sizes of the thumbnails is different since they are rendered from the perspective of the viewing point.

Now, assume that the user activated the button 932 or the forward button 951a of the panel 951. Referring to the display 1100' of FIG. 11B, notice that viewing point has descended within the tank such that objects 1112, 1114, 1116, 1118, 1120, 1122, and 1124 are no longer visible since they are "above" the viewing point. This is similar to the known concept of "culling" of objects which occurs when objects are "behind" the viewing point. However, even these thumbnails may still cast shadows to the floor 912 of the tank. Alternatively, thumbnails "above" the viewing point need not cast shadows in the manner described. Comparing FIGS. 11A and 11B, due to the change in the viewing point, the perceived sizes of the thumbnails 1102, 1104, 1106, 1108, and 1110, as well as the floor 912 of the tank, are larger in display 1100' than in display 1100. However, the shading or fading of the thumbnails is the same. Alternatively, as the user's viewing point "dives" into the tank, the object thumbnails may become clearer.

Finally, recall from §4.1 above that the present invention may use higher resolution image representations of objects, or "live" objects within an associated application, for editing or otherwise working on a selected object. The selected object thumbnail may be displayed in a preferred viewing position. The selected object thumbnail may be a high resolution bit map (e.g., 512 pixels by 512 pixels with 24 bit color). To reiterate, rather than merely providing a high resolution object thumbnail, the actual object, in its associated application, may be presented. In this example, the Internet Explorer™ Internet browser (part of Microsoft Windows NT® 4.0 operating system sold by Microsoft Corporation of Redmond, Wash.) may be rendering a web page, with the user interface of the present invention in the background. The application can be maximized, as is known to those skilled in the art, to substantially fill the screen of the video monitor. Further, the images may be rendered as an off-screen bitmap, which can be placed in the preferred viewing position when an object is selected. If the objects are HTML web pages, this may be done, for example, using techniques discussed in the article, M. Heydt, "Incorporating the Web Browser Control Into Your Program", *Microsoft Interactive Developer*, Vol. 3, No. 7, pp. 42-51 (July 1998).

In consideration of interface consistency to the user, when an object thumbnail not on the surface of the tank is "floated", an animation, taking on the order of one second, may be used to move the object thumbnail from its position and depth, to a corresponding position on the surface of the tank. Similarly, when an object thumbnail, below, or on, the surface of the tank is "selected", an animation, taking on the order of one second, may be used to move the object thumbnail from its position below, or on, the surface of the tank to a preferred viewing location (such as above the surface of the tank) and use the larger high resolution thumbnail or the application with the "live" object. In each case, the user will perceive the object thumbnail as moving towards them.

Having described functions which may be performed by the present invention, as well as exemplary displays which may be rendered by the present invention, exemplary processes, methods, and data structures which may be used to effect, at least certain aspects of the present invention, as now described in §4.2.3.

§4.2.3 Exemplary Processes, Methods and Data Structures

In the following, a high level overview of processes and an animation loop method will be presented in §4.2.3.1 with reference to FIGS. 2A, 3 through 8, and 13. Thereafter, processes and methods for managing inputs, updating state information, managing special services, and managing outputs, will be presented in §4.2.3.2 through §4.2.3.5.

§4.2.3.1 Overview of Processes and Animation Loop Method

In the following, high level processes which may be used to effect at least some aspects of the user interface of the present invention, are described, with reference to FIG. 2A, in §4.2.3.1.1. Next, exemplary data structures for storing data which may be used by one or more processes of the present invention are described, with reference to FIGS. 3 through 8, in §4.2.3.1.2. Finally, an exemplary high level method for effecting at least some aspects of the user interface of the present invention is described, with reference to FIG. 13, in §4.2.3.1.3.

Figure 2A:
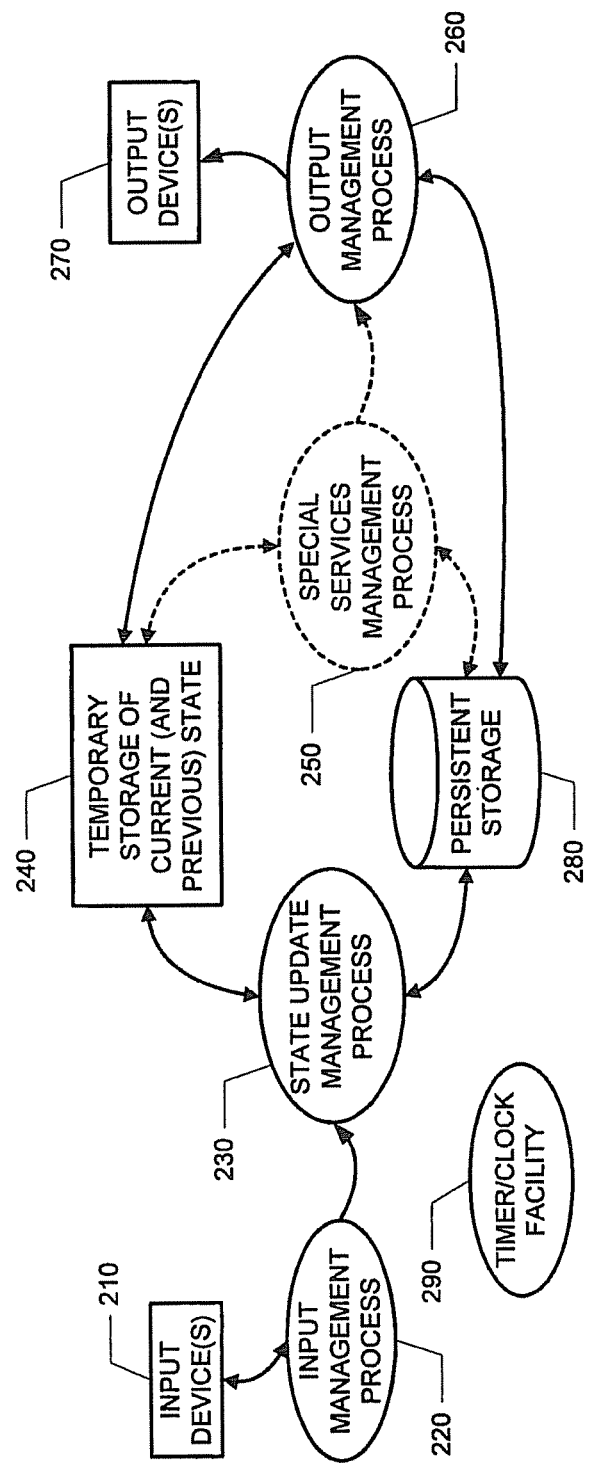

§4.2.3.1.1 High Level Processes (FIG. 2A)

FIG. 2A is a high level diagram of processes and stored data which may be used to effect, at least certain aspects of, the user interface of the present invention. Basically, the processing by the present invention may be thought of as a sequence of cycles. In each cycle, user inputs are accepted, states are updated, if necessary, based on such user inputs, and a display is rendered (and audio is output) based on the updated states. More specifically, referring to FIG. 2A, user inputs from input devices 210 are managed by an input management process (or more generally, an "input manager") 220. A state update management process 230 uses information from the input management process 220, as well as information of a previous state stored at temporary storage means 240, to update the state. This updated state is then stored back to the temporary storage means 240. To the extent that state changes or transitions need to be accounted for, the temporary storage means 240 may also store one (or more) preceding state. Alternatively, state change or state transition flags may be stored in the temporary storage means 240. A special services management process 250 may be used to perform special functions, such as proximity clustering and implicit query. Finally, based on the state information stored in the temporary storage means 240, and information which may be generated by the special services management process, an output management process (or more generally, an "output manager") 260 generates outputs (such as video display and audio signals) for provision to the output devices 270. Persistent storage 280 can store information which may be used and/or generated by the state update management process 230, the special services management process 250, and/or the output management process 260. The timer/clock facility 290 may be used to provide relative timing functions and absolute times to any of the processes.

§4.2.3.1.2 Exemplary Data Structures (FIGS. 3-8)

Figure 3:
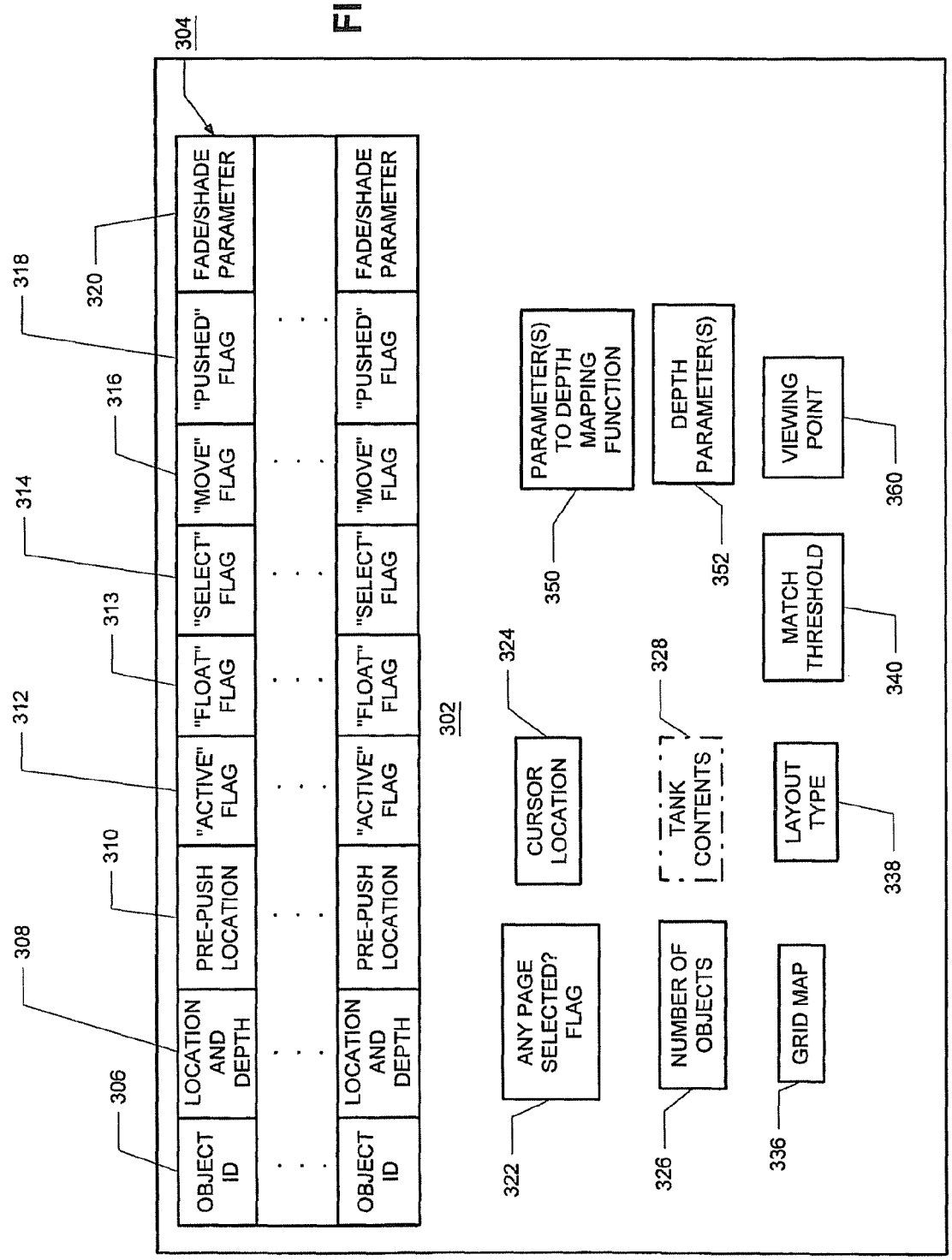
FIG. 3 is an exemplary data structure of data which may be stored and used when effecting the user interface of the present invention.
Figure 4:
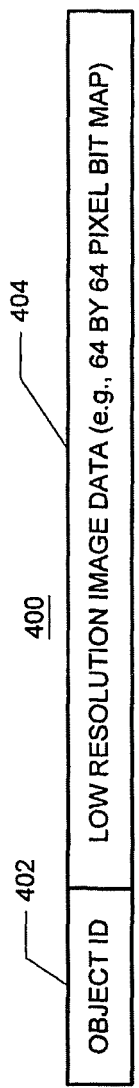
FIG. 4 is an exemplary data structure of a record of low resolution image data of an object which may be used when effecting the user interface of the present invention.
Figure 5:
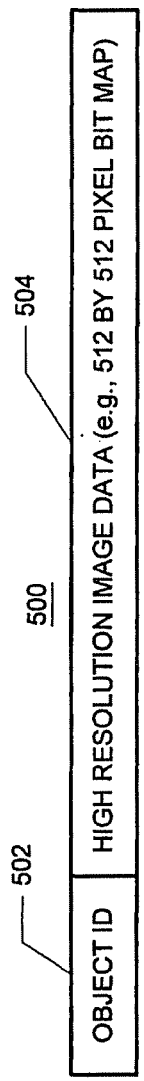
FIG. 5 is an exemplary data structure of a record of high resolution image data of an object which may be used when effecting the user interface of the present invention.
Figure 7:
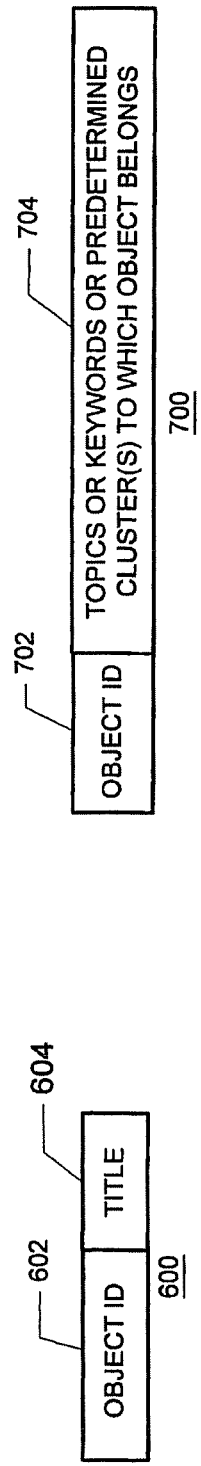
FIG. 7 is an exemplary data structure of a record of implicit query information which may be used when effecting the user interface of the present invention.
Figure 6:
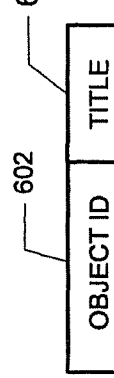
FIG. 6 is an exemplary data structure of a record of title (or other) data which may be used when effecting the user interface of the present invention.

Below, the state information, which may be stored in the temporary storage device 240, is described. FIG. 3 is an exemplary data structure 300 of state (and other) information which may be used by the user interface of the present invention. Object information 302 may include a record 304 corresponding to each object. As shown in FIG. 3, an object record 304 may include an object identifier field 306 which includes a value used to distinguish the object from all other objects. For example, if the object is an HTML page on the Internet, the object identifier may be a URL (or "Uniform Resource Locator"). Accordingly, each object should have a unique object identifier value in field 306. The object record 304 may also include a location field 308 which contains information about the location of the object (or object thumbnail). The location information in field 308 may include a two-dimensional plane location and a depth, or coordinates which may be mapped to a screen location. In one embodiment, a grid (not displayed to the user) may be used to overlay the monitor screen or the layers of depth of the data tank. In this case, for each layer of depth, each object will be anchored to a particular grid coordinate which will be stored in that object's location field 308. If an object thumbnail is "pushed", as will be discussed in detail below to avoid full object occlusion, in one embodiment, its pre-push location also may be stored in field 310 for reasons which will become apparent below. Each object record 304 may also include a field 312 containing a flag indicating whether or not the object is "active" (as described below), a field 313 containing a flag indicating whether or not the object is "floated", a field 314 containing a flag indicating whether or not the object is "selected", a field 316 containing a flag indicating whether or not the object is "moving" (as described below), a field 318 containing a flag indicating whether or not the object is being "pushed" (as described below), and a field 320 containing a fade or shade parameter. Regarding field 320, since a fade or shade parameter may be determined on the basis of the object's depth, this field may include redundant information which might not be strictly necessary. If any of the objects are selected, the "any page selected?" flag is set in field 322.

In addition to the object information 302, the state information 300 may also includes a cursor location field 324 for storing a two-dimensional location of a cursor. The number of objects may be stored in field 326. The viewing point location (and orientation) may be stored in field 360.

Other parameters may be used when rendering the display. These parameters are either fixed or may have default values which may be changed by the user. For example, a tank content may be fixed, or may be selected or changed by the user and stored in field 328. For example, if the tank content is "water", the thumbnails may be rendered darker and shaded more blue as their depth within the tank increases. If the tank content is "fog", the thumbnails may be rendered with less resolution and/or with darker shading as their depth increases. Although the color and/or shading are shown as blue in the exemplary displays, alternatively, other colors, or even a grayscale, may be used to provide a visual depth cue. The type of layout (such as gridded or continuous with push, as will be described later) may be fixed, or may be changed or selected by the user and stored in field 338. If the layout is a gridded layout, a grid map, which defines the resolution of the grid, may be fixed, or may be changed or selected by the user and stored in field 336. If the invention is to include an implicit query function, (as will be described later), a "match threshold" value may be fixed, or may be selected or changed by a user and stored in field 340. Finally, depth parameter(s), as well as a parameter to depth mapping function, may be stored in fields 352 and 350, respectively. For example, the depth may be defined as:

$$\text{DEPTH} = \text{number of clicks since last selection}.$$

Thus, depth may be a linear function of a single parameter. Alternatively, depth may be defined as:

$$\text{DEPTH} = \log(\text{number of clicks since last selection}).$$

Thus, the depth may be a logarithmic function of a single parameter. Basically, the depth of an object may be a linear, polynomial, or exponential function of one or more of its parameters or properties. Thus, for example, an object's depth may be defined as:

$$\text{DEPTH} = (\text{size in bytes}/10) \times (\text{number of clicks since last selection})^{0.75}.$$

Figure 13:
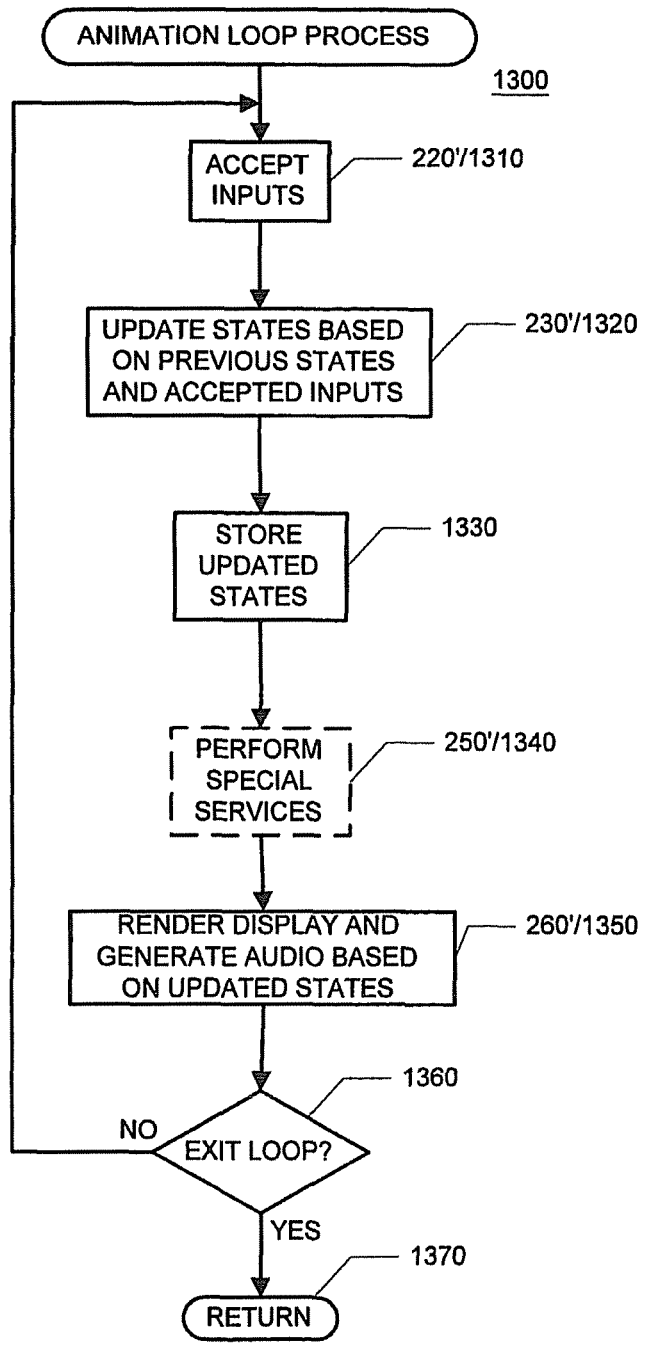
FIG. 13 is a high level flow diagram of an animation loop process which may be used by the user interface of the present invention.

§4.2.3.1.3 Exemplary Method (FIG. 13)

FIG. 13 is a high level flow diagram of an exemplary animation loop process 1300. First, as shown in act 220'/1310, an input is accepted. This act will be discussed later with reference to FIG. 14. Next, as shown in act 230'/1320, states are updated based on previous states and accepted inputs. This act will be discussed later with reference to FIGS. 15 through 20. Next, as shown in act 1330, the updated states are stored. (Recall, for example, the temporary storage 240.) As shown in optional act 250'/1340, special services, such as launching an implicit query or clustering proximally located thumbnails, may be carried out. Finally, in act 260'/1350, a display is rendered and audio is output based on the updated states. This act will be discussed later with reference to FIG. 21. At conditional branch point 1360, it is determined whether or not a exit command was entered by the user. If so, the method 1300 is left via RETURN node 1370. If, on the other hand, no exit command was entered by the user, processing branches back to act 220'/1310.

§4.2.3.2 Managing Inputs

In the following, processes related to managing inputs are described, with reference to FIG. 2B, in §4.2.3.2.1. Thereafter, an exemplary method for performing this process is described, with reference to FIG. 14, in §4.2.3.2.2.

Figure 2C:
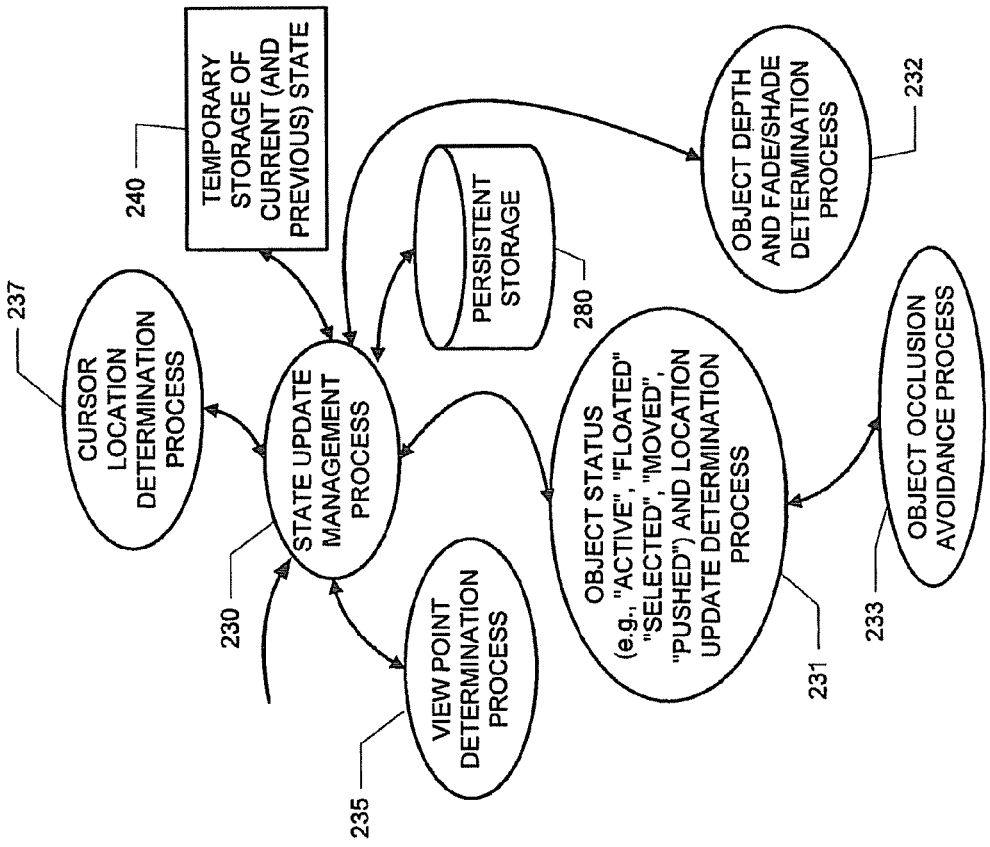
Figure 2B:
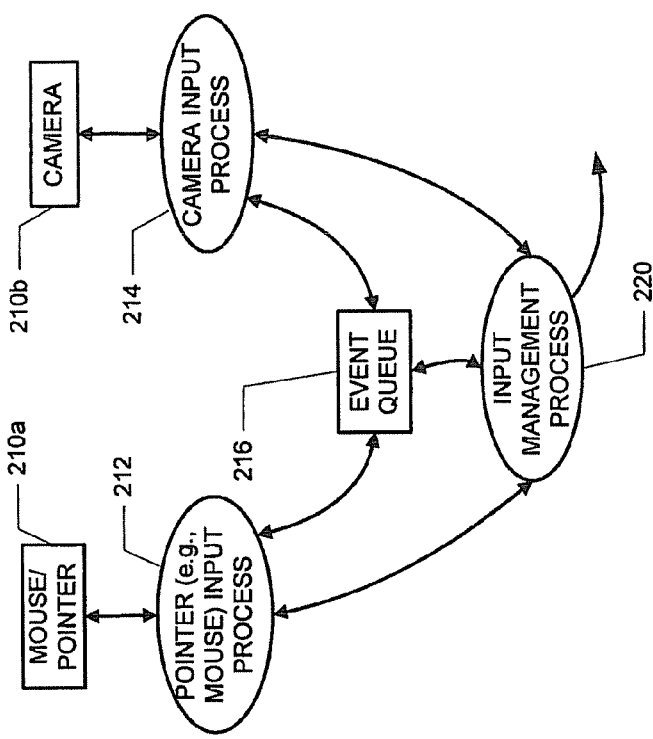

§4.2.3.2.1 Processes for Managing Inputs (FIG. 2B)

Processes related to the input management process 220 are now described with reference to FIG. 2B. As shown in FIG. 2B, a user may interact with the user interface of the present invention using a pointing device 210a, such as a mouse for example. The pointer input management process (or more generally, a "2D input facility") 212 provides user inputs, from the pointing device 210a, to the input management process 220, either directly or through an event queue 216. A user may also interact with the user interface of the present invention using gestures captured by a camera 210*b*. The camera input management process (or more generally, a "camera input facility") 214 provides user inputs, from the camera 210*b*, to the input management process 220, either directly or through an event queue 216. The input management process 210 passes this information to a state update management process 230.

Figure 14:
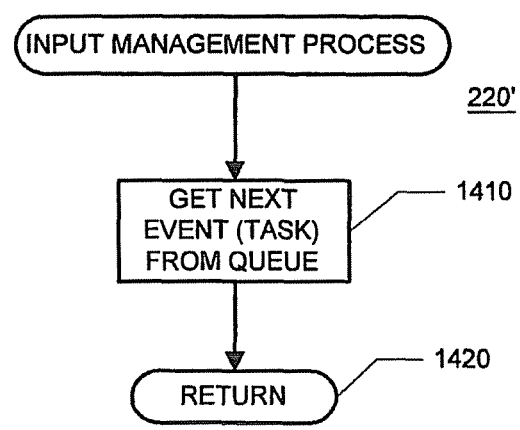
FIG. 14 is a flow diagram of an exemplary method for performing an input management process.
Figure 15:
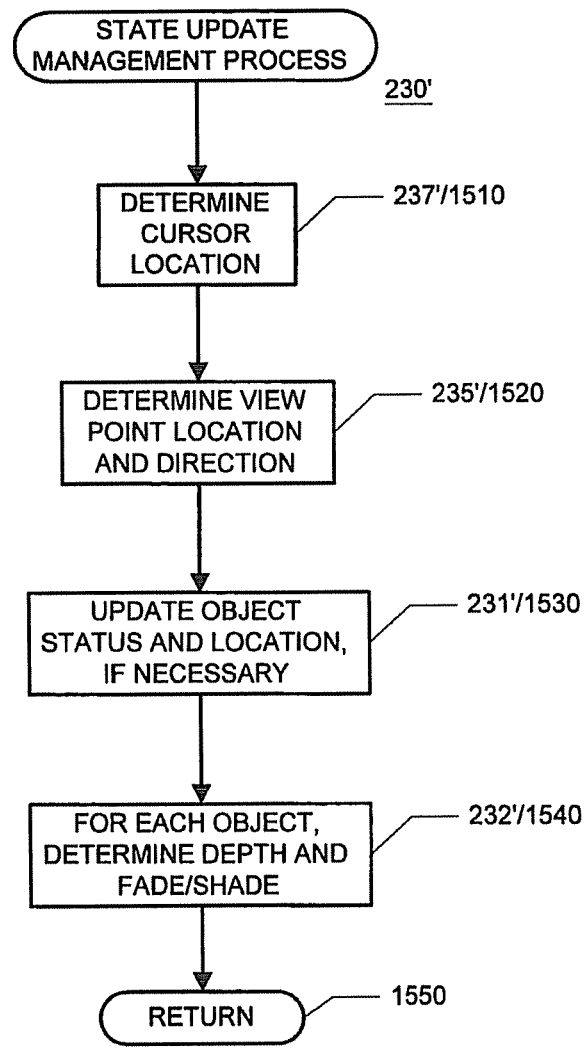
FIG. 15 is a flow diagram of an exemplary method for performing a state update management process.

§4.2.3.2.2 Exemplary Method for Managing Inputs (FIG. 14)

Recall from act 220'/1310 that inputs are accepted. FIG. 14 is a high level flow diagram of an exemplary method 220' for effecting the input management process. As shown in act 1410, a next event is fetched from a queue. The method 220' is then left via RETURN node 1420.

§4.2.3.3 Managing State Information

In the following, processes related to managing state information are described, with reference to FIG. 2C, in §4.2.3.3.1. Thereafter, exemplary methods for performing these processes are described, with reference to FIGS. 15 through 20, in §4.2.3.3.2.

§4.2.3.3.1 Processes for Managing State Information (FIG. 2C)

Processes related to the state update management process 230 are now described with reference to FIG. 2C. Referring back to FIG. 2A, the state update management process 230 may accept information from the input management process 220. The cursor location determination process (or more generally, a "cursor location determination facility") 237 can use information, originally from the mouse/pointer 210*a*, as well as present cursor position information (Recall field 324 of FIG. 3.), to determine a present location of a cursor. This may be done in a known manner for example.

Figure 20:
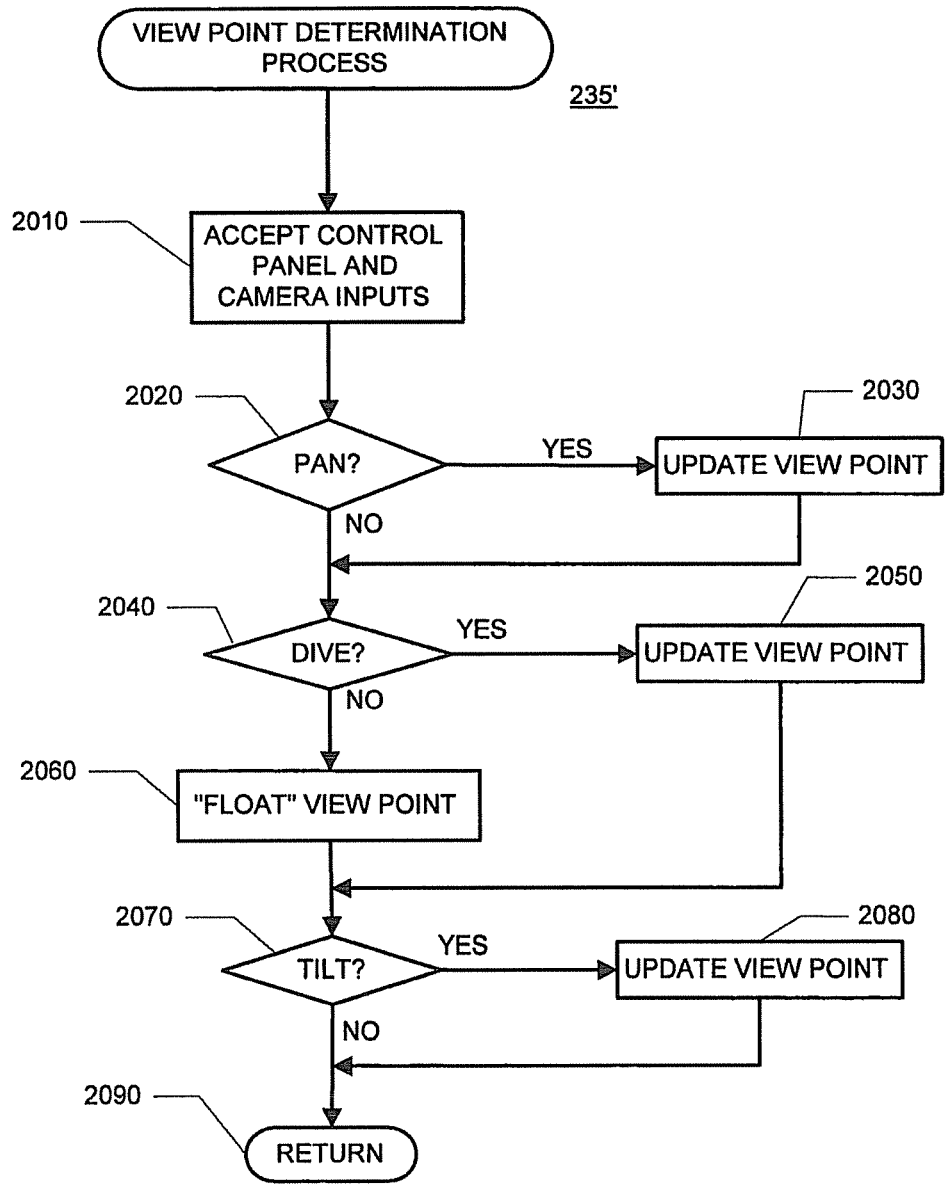
FIG. 20 is a flow diagram of an exemplary method for performing a view point determination process.

The view point determination process (or more generally, a "view point determination facility") 235 may use cursor location information, information, originally from the camera 210*b*, as well as present view point information (Recall field 360 of FIG. 3.) to determine a present view point and orientation. FIG. 20 is a flow diagram of an exemplary method 235' for performing a view point determination process. First, as shown in act 2010, control panel (Recall, e.g., sub-panels 930 and 940, and buttons 951-954 of FIG. 9.) and camera inputs are accepted. Next, as shown in conditional branch point 2020, if a pan command exists (Recall buttons 952 and 953 of FIG. 9.), the view point is updated accordingly as shown in act 2030 and processing continues to conditional branch point 2040. Returning back to conditional branch point 2020, if a pan command does not exist, then processing continues directly to conditional branch point 2040. As shown in conditional branch point 2040, if a dive (or ascend) command exists (Recall, e.g., sub-panel 951 of FIG. 9.), the view point is updated accordingly as shown in act 2050 and processing continues to conditional branch point 2070. Returning back to conditional branch point 2040, if a dive (or ascend) command does not exist, then processing continues to act 2060 where the viewing point is "floated" by a predetermined amount (not necessarily all the way to the surface). Alternatively, act 2060 may be skipped. At conditional branch point 2070, if a tilt command exists (Recall, e.g., sub-panel 940 and buttons 941 and 942.), the viewing point is updated accordingly as shown in act 2080 and processing continues to RETURN node 2090. Returning to conditional branch point 2070, if a tilt command is not determined, then processing continues directly to the RETURN node 2090.

Although the pan, dive and tilt commands were described with reference to sub-panels or buttons, head gestures of a user, captured by the camera 210*b* and interpreted can be used instead of, or in addition to, such input means. For example, a user leaning their head towards or away from the camera may be interpreted as diving and ascending. A user turning their head left, right, up, or down may be interpreted as tilting. Finally, a user moving their head left, right, up, or down may be interpreted as panning. For example, the camera inputs may be processed to determine whether the user's head is located to one side, or the other, or above or below the center of the video monitor. The position of the user's head may be determined using known techniques such as detecting a "blob" of color as a face or a "draping" technique in which an image from the camera before the user was seated before the monitor is subtracted from a current image.

Referring back to FIG. 2C, using the location of the cursor, as well as the locations and depths of the objects stored in fields 308 of records 304 of the object information 302, the object state and location determination process (or more generally, an "object state update facility") 231 may determine, for each object: (i) whether the object is "active", "floated", "selected", "moving", or "pushed"; (ii) the location of the object; and (iii) the depth of the object. If an object is "moving", its location is updated. Further, if any object is "moving", an (total) occlusion avoidance process 233 process may be performed. Each of the object states is now described with reference to FIG. 17.

FIG. 17 is a diagram of states and state transitions which the user interface of the present invention may use. Starting from an initial or default state 1700, if an object is activated, the object becomes "active" at state 1710. An object may become activated, for example, when a cursor is on, or passes over, or hovers over (note timer/clock facility 290.) an object thumbnail. The object may be "deactivated" when the cursor is taken off the object for example, in which case, the default state 1700 is reentered. Alternatively, if an active object is below the tank surface and a float command, for example a mouse click, is issued, the object becomes "floated" at state 1715. If the object is "sunk", for example by a right mouse click, the state 1710 in which the object is "active" is reentered. Alternatively, if a "floated" object is selected, for example, by a single mouse click, the object "selected" state 1720 is entered. In one embodiment, any object (that is, not necessarily only a "floating" object) may enter the object "selected" state 1720 when a selection command, such as a double mouse click for example, is entered. In the object "selected" state, an enlarged high resolution thumbnail of the object may be rendered at a preferred viewing location, such at the bottom center of the display screen for example. Alternatively, in the object "selected" state, a "live" object may be loaded into its associated application, such as a WORD document being rendered in a word processing program or an HTML page being rendered on an Internet browser program, for example. From the object "selected" state 1720, the object "floated" state 1715 can be reentered in response to a de-selection command, such as a mouse click on a "minimize" button for example.

Referring back to the "active" object state 1710, if the object is subject to a translation command, for example via a traditional left mouse button dragging operation, the "moving" state 1730 is entered. From the "moving" state 1730, if the object is released, for example by releasing the left mouse button during a drag operation, the "active" state 1710 is reentered. When the object is in the "moving" state 1730, its location will be updated. Object occlusion may be avoided as follows. In one embodiment (not shown), only "floated" objects may be moved. In yet another embodiment, any object, including floating objects, may be moved.

In the following descriptions of object occlusion avoidance techniques, only objects at the same depth may be considered or, alternatively, all objects may be projected to a predetermined depth, such as the surface of the data tank for example. Note that in the latter alternative, the depths of the objects are basically ignored. In yet another alternative, one or more depths may be grouped and considered together for the purposes of object occlusion avoidance. For example, if an object is being moved, objects in the five depth levels above and in the five depth levels below that object may be considered during object occlusion avoidance.

With the foregoing alternatives in mind, assuming that the layout type (Recall field 338) is "continuous with push", if the location or position of the moving object is within a predetermined distance of another object (at its depth layer, within a predetermined number of depth layers, or at any depth), the other object enters the "pushed" state 1740 and its location is updated so that (total) occlusion between the "moving" object and the "pushed" object is avoided. Note that a "pushed" object may cause other objects to be pushed. In one embodiment, if the moving object is no longer within the predetermined distance of the pre-push location of the other object, the other object is no longer "pushed" and takes on its pre-push location as shown by the dashed transition lines and state 1745. An animation may be used to move a pushed object from a current location to it pre-push location. The animation may take on the order of one (1) second. In one embodiment, the animation takes less than ½ second. In another embodiment, the distance between the current location of the "pushed" object and the moving object is used to determine whether a "pushed" object continues to be "pushed". If, while a "moving" object is pushing a "pushed" object, the "moving" object is no longer pushed or pulled, for example, by releasing the left mouse button during a drag operation, the default state 1700 is reentered and objects previously "moved" and "pushed" are no longer in those respective states, and they are rendered at their last determined locations. If the object "moving" takes on a location beyond the predetermined distance of the other object being "pushed", that other object will no longer be "pushed".

The foregoing assumed that the layout type was "continuous with push". Assuming, on the other hand, that the layout type is "gridded", an object may be continuously moved about the landscape. However, when the object is released, its position assumes the nearest open (i.e., not taken by another object) grid position. To reiterate, the grid may overlay the screen or any layer of the tank. The resolution of the grid is stored in the grid map field 336.

Recall that a tank content may be fixed, or may be selected or changed by the user and stored in field 328. Recall, for example, that if the tank content is "water", the thumbnails may be rendered darker and shaded more blue as their depth increases. If the tank content is "fog", the thumbnails may be rendered with less resolution and/or shaded darker as their depth increases. Referring back to FIG. 2C, a fade or shade determination process 232 may be used to determine and change a display characteristic (such as shade, resolution, darkness, etc.) of an object thumbnail based on its depth.

§4.2.3.3.2 Exemplary Methods for Managing State Information

Figure 16:
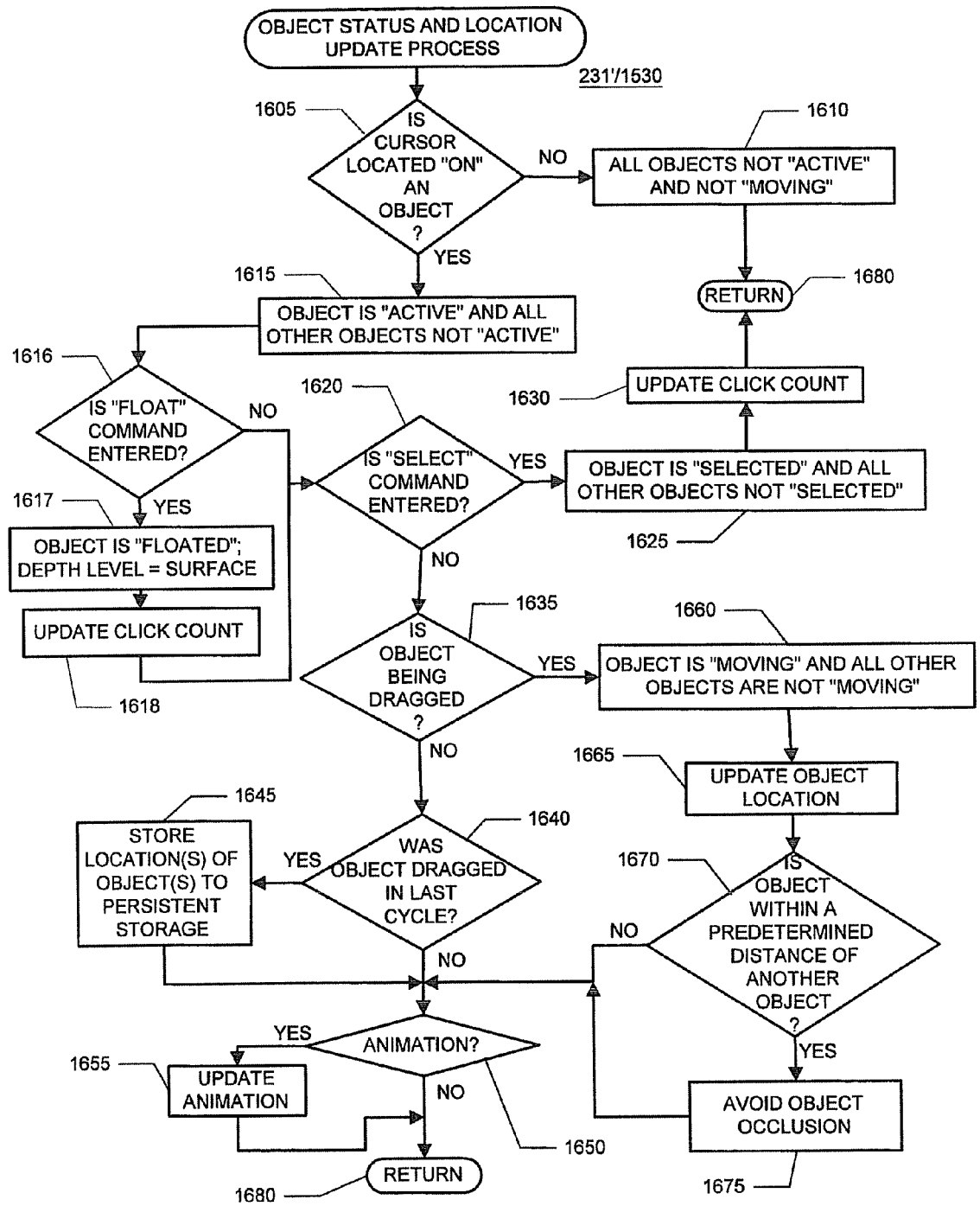
FIG. 16 is a flow diagram of an exemplary method for performing an object status and location update process.

Recall from act 230'/1320 that states are updated based on previous states and accepted inputs. FIG. 16 is a flow diagram of an exemplary method 230' for effecting a state update management process. First, as shown in act 237'/1510, a cursor location is determined. This determination may be based on a previous cursor location and pointer inputs, and may be performed in a known way. Further, as shown in act 235'/1520, a view point location and orientation is determined. This determination may be based on previous view point information and pointer inputs relative to the control panel 920. Next, as shown in act 231'/1530, the status and location of an object is updated, if necessary. An exemplary method for performing this act will be described below with reference to FIG. 16. Finally, as shown in act 232'/1540, for each object, a depth and fade or shade is determined. An exemplary method for performing this act will be described below with reference to FIG. 19.

As just described, a state update management process 230 may include a act of updating, if necessary, an object's status and location. FIG. 16 is a flow diagram of an exemplary method 231'/1530 for effecting an object status and location update process. First, at conditional branch point 1605, it is determined whether or not the cursor is located "on" (or hovers over) an object (thumbnail). (Recall timer/clock facility 290.) If not, no objects can be active, nor can any object be moving. Records (e.g., 304) of objects may be updated to reflect this fact in act 1610. The method 231'/1530 is then exited via RETURN node 1680. Returning to conditional branch point 1605, if the cursor is located on (or is hovering over) an object, the object is "active" (and therefore, other objects may be not "active".) Records (e.g., 304) of objects may be updated to reflect this fact in act 1615. Processing then continues to conditional branch point 1616.

At conditional branch point 1616, it is determined whether or not a "float" command is entered. Recall from the description of FIG. 17 above that a float command may be effected by a single mouse click when a cursor is over an object which is below the surface layer of the data tank. If a float command is entered, the record of the object is updated to reflect this fact and the depth level of the object is set to the surface level as shown in act 1617, and a "click count" is updated as shown in act 1618, from which processing continues to conditional branch point 1620. Returning to conditional branch point 1616, if a "floated" command is not entered, processing continues directly to conditional branch point 1620.

At conditional branch point 1620, it is determined whether or not the "active" object is "selected". If so, then the object is "selected" (and therefore, other objects may be not "selected"). Records (e.g., 304) of objects may be updated to reflect this fact in act 1625, and a click count is incremented as shown in act 1630. The method 231'/1530 is then left via RETURN node 1680. Returning to conditional branch point 1620, if the "active" object is not "selected", processing continues to conditional branch point 1635. At conditional branch point 1635, it is determined whether or not the "active", perhaps "floated", but not "selected", object is "moving" (or being dragged). If not, processing continues to conditional branch point 1640 which determines whether or not the object just transitioned from "moving" to "not moving". That is, conditional branch point 1640 determines whether or not the object was dragged (i.e., moving) in the last cycle. If so, as shown at act 1645, the location(s) of the object(s) are stored to a persistent storage means (Recall storage device 280 of FIG. 2A.), and processing continues at conditional branch point 1650. Otherwise, processing continues directly to conditional branch point 1650. At conditional branch point 1650, it is determined whether an animation is running. If so, as shown in act 1655, the animation is updated (Recall records 850.) and the process 231'/1530 is left via return node 1680. If not, the process 231'/1530 is left directly, via RETURN node 1680.

Returning to conditional branch point 1635, if the object is being "moved", then no other objects will be "moving" (though they may be "pushed" as discussed below). Records (e.g., 304) of objects are updated to reflect this fact in act 1660. The object's new location is determined in act 1665. Recall that total object (thumbnail) occlusion may be avoided. In conditional branch point 1670, it is determined whether or not the "active" and "moved" object is within a predetermined distance of any other object (within the same depth layer, within a predetermined number of adjacent depth layers, or within any depth layer). If not, processing continues at conditional branch point 1650 which was described above. If, on the other hand, the "active" and "moved" object is within a predetermined distance of another object(s), total object (thumbnail) occlusion is avoided in act 1675 and processing continues at conditional branch point 1650. Exemplary processes for avoiding object occlusion are discussed below with reference to FIGS. 18A and 18B.

In each of the following exemplary object occlusion avoidance methods, keep in mind that three alternatives are possible. In the first alternative, only the objects in the same depth level as the moving object are considered. In the second alternative, objects within a predetermined number of depth levels of the depth level of the moving object are considered. Finally, in the third alternative, all objects are considered, regardless of their depth level. Thus, the first and third alternatives are simply special cases of the second alternative. That is, if the predetermined number of depth levels is zero (0), the first alternative results, and if the predetermined number of depth levels is set to the total number of depth levels in the tank, the third alternative results. Having described these three alternatives in which each of the exemplary methods can be used, two exemplary methods for avoiding object occlusion are now described with reference to FIGS. 18A and 18B.

Figure 18A:
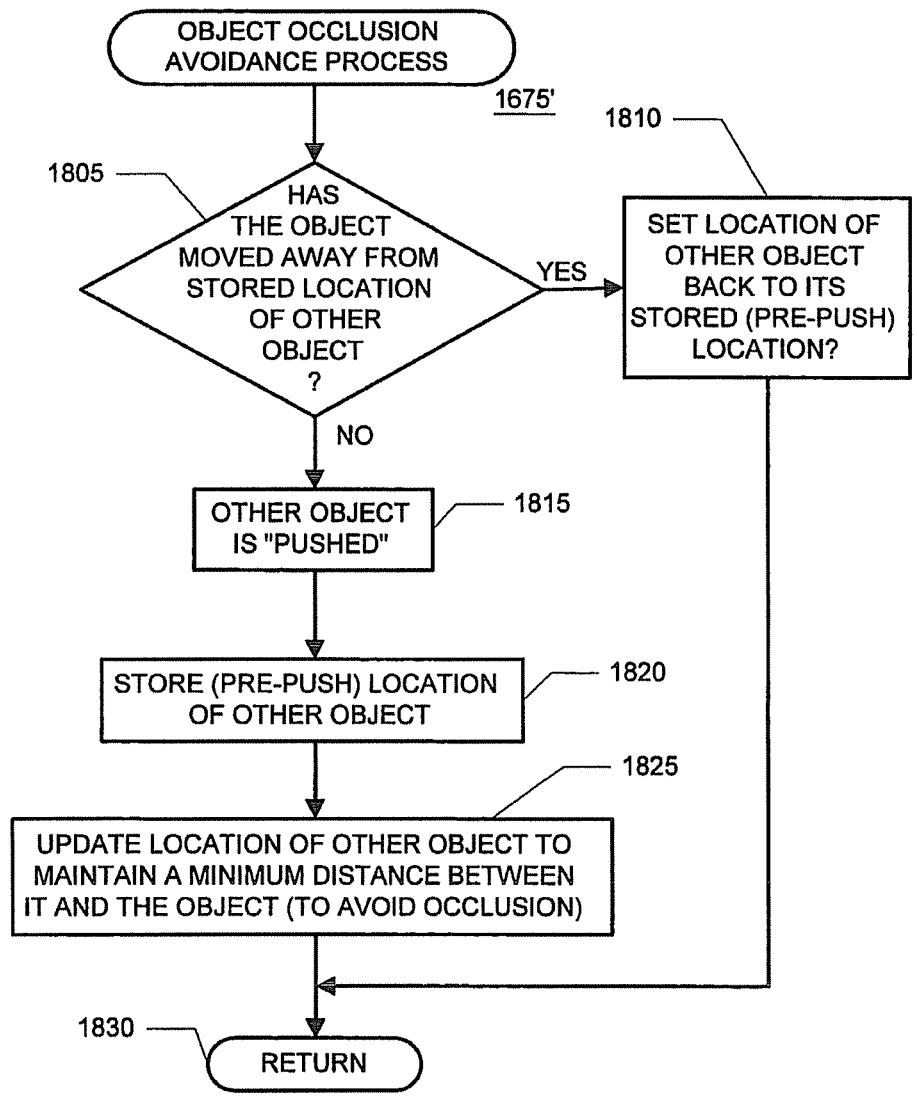
FIGS. 18A and 18B are flow diagrams of alternative object occlusion avoidance methods.

FIG. 18A is a flow diagram of an exemplary process 1675' for avoiding object (thumbnail) occlusion assuming a "continuous with push" layout type. (Recall field 338 of FIG. 3.) First, at conditional branch point 1805, it is determined whether or not the "active" and "moving" object has moved (a predetermined distance) away from a stored location (or, in an alternative embodiment, the present location) of the other object. If not, as shown in act 1815, the other object is "pushed" and the record (e.g., 304) of the other object is updated to reflect this fact as shown in act 1820. Further, in one embodiment, the pre-push location of the "pushed" object is stored. (Recall, e.g., field 310 of FIG. 3.) Then, as shown in act 1825, the location of the "pushed" object is updated to maintain at least a predetermined minimum distance between it and the "active" and "moving" object. (Recall location field 308.) The "pushed" object may move out of the way of the "moved" object by effecting an animation, which may last about one second. Alternatively, the faster the "moved" object is moving, the faster the "pushed" objects may move aside. Thus, in this embodiment, the "moved" object is like a person walking or running through tall grass (pushed objects) which move out of the person's way but resume their position after the person leaves. The method 1675' is then left via RETURN node 1830.

Returning to conditional branch point 1805, in this embodiment, if the "active" and "moving" object has moved away from the pre-push location (e.g., stored in field 310 of the record 304 of the "pushed" object), of the "pushed" object, then the location of the "pushed" object (e.g., location field 308) is set back to its pre-push location as shown in act 1810. This may be effected with an animation which may take about one half of a second.

Figure 18B:
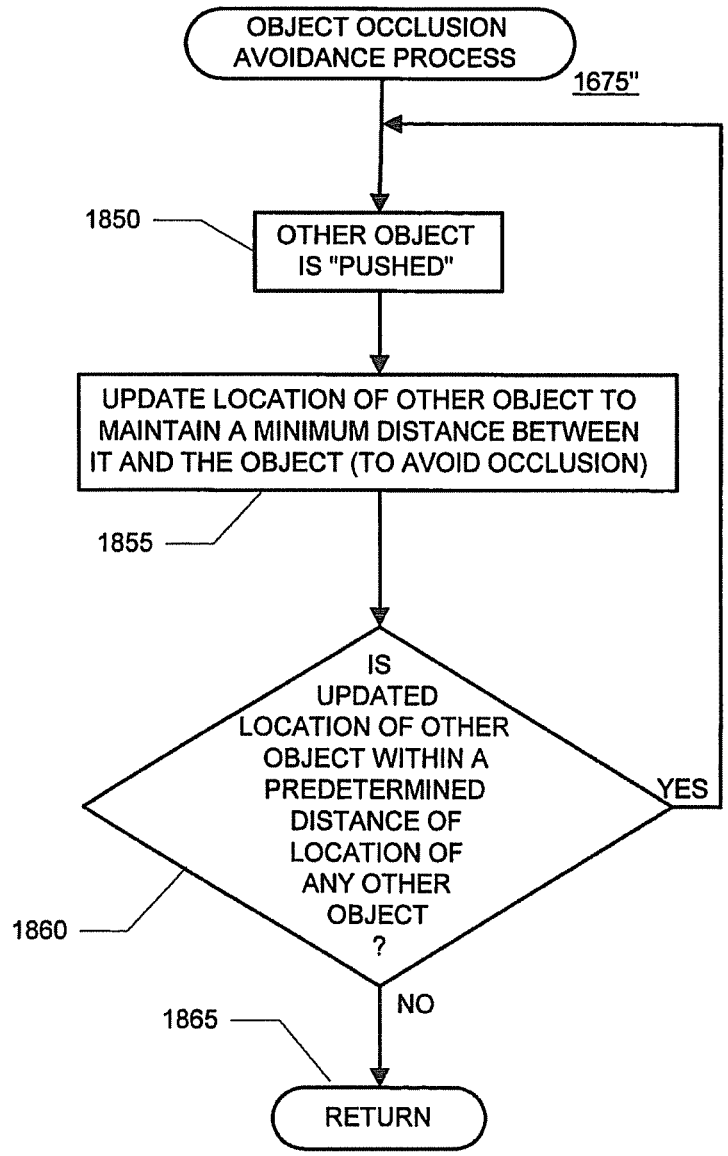

FIG. 18B is a flow diagram of an alternative exemplary process 1675" for avoiding object (thumbnail) occlusion, again assuming a "continuous with push" layout type. (Recall field 338 of FIG. 3.) First, as shown in act 1850, the other object is indicated as being "pushed". Next, in act 1855, the location of the other object is updated to maintain at least a minimum distance between it and the "moved" object. Then, at conditional branch point 1860, it is determined whether the updated location of the "pushed" object is within a predetermined distance of a location of any other objects. If so, those further objects must also be "pushed" to avoid total occlusion by, or to avoid totally occluding, the "pushed" object, and processing continues at act 1850. That is, the minimum distance condition is transitively propagated, if necessary, to displace neighboring object thumbnails. Otherwise, the method 1675" is left via RETURN node 1865.

In this alternative way of avoiding object occlusion, the pre-push position of object thumbnails need not be stored. When a moving operation ceases (e.g., when the left mouse button is released during a drag operation), all object thumbnails maintain their location at that time.

Assuming that a "gridded" layout is used instead of a "continuous with push" layout, when an active object is released, it is anchored to the nearest available (i.e., having no other anchored object) grid point. In this way, total object occlusion is avoided. One object may partially occlude another(s).

Figure 19:
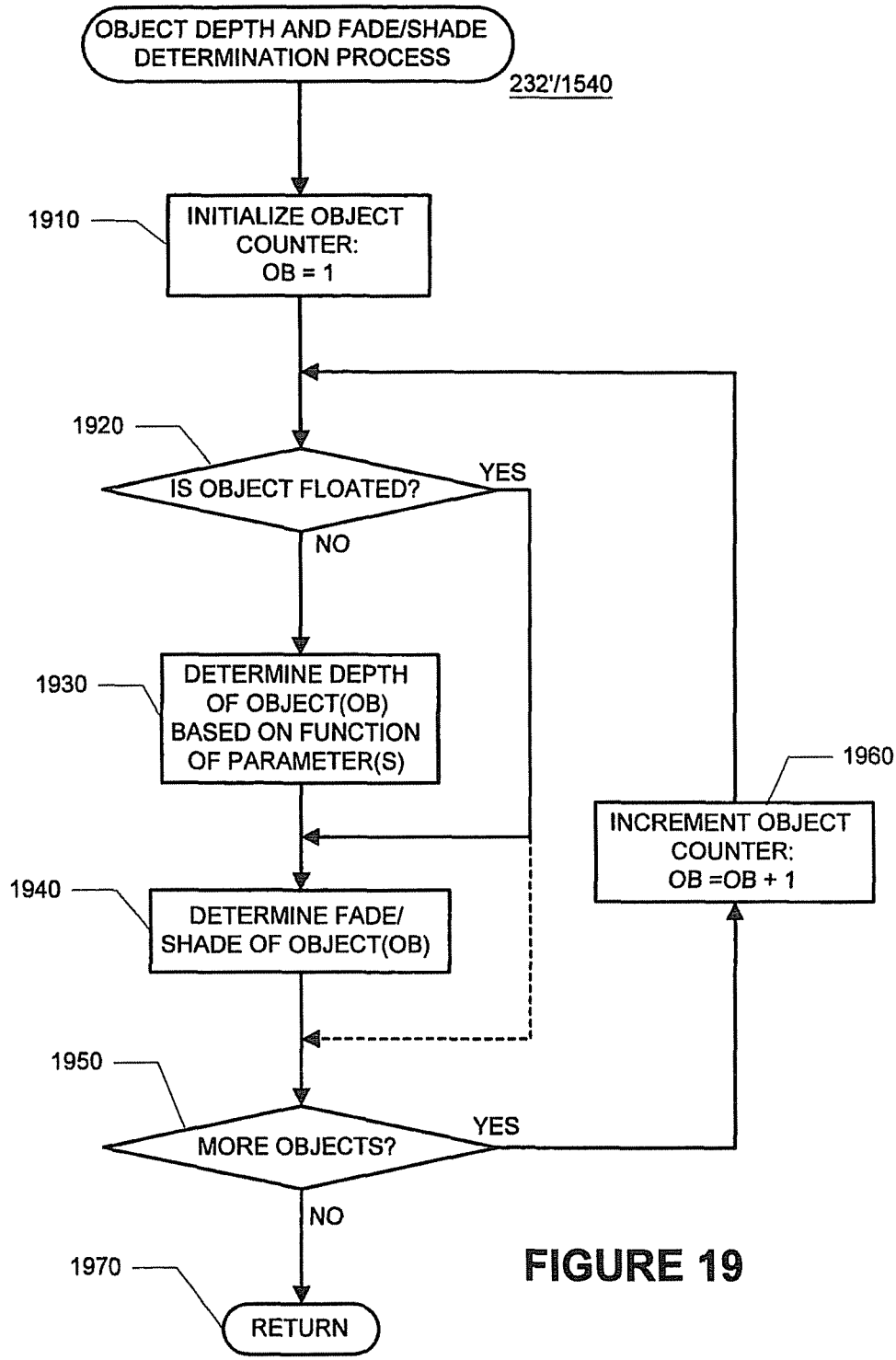
FIG. 19 is a flow diagram of an exemplary method for performing an object depth and fade or shade determination process.

Recall from FIG. 2C above that a state update management process 230 may use a object depth and fade or shade determination process 232. FIG. 19 is an exemplary method 232'/1540 for performing this process. The acts of this method may be performed for each of the objects. Thus, the method defines a loop through each of the objects. As shown in act 1910, an object counter is initialized (OB=1). Next, as shown in conditional branch point 1920, it is determined whether or not the object is "floated". Since "floated" objects are on the surface of the tank, their depth need not be determined. Thus, if an object is "floated", processing branches to act 1940 at which the shade or fade of the object is determined. If it can be assumed that "floated" objects are not shaded or faded, processing can branch to conditional branch point 1950 as shown by the dashed line. Returning to conditional branch point 1920, if the object is not "floated", processing continues to act 1930. At act 1930, the depth level of the object is determined based on a function of one or more parameters. As discussed above, the function may be linear, polynomial, or exponential. Mathematically, any properties or parameters can be used, so long as each has a "partial ordering" on it. For example, the parameter(s) may include one or more of the following: click history, age, time since last use, size, file type, associated application, classification, author, etc. Next, as shown in act 1940, the shade or fade of the object is determined. At conditional branch point 1950, it is determined whether there are any more objects to process. If so, processing branches to act 1960 where the object counter is incremented (OB=OB+1).

Processing then continues back to conditional branch point 1920. Returning to conditional branch point 1950, if no more objects are to be processed, the method 232'/1540 is left via return node 1970. Referring back to conditional branch point 1920 and acts 1930 and 1940, the fade and/or shade of a floated object could be calculated just like any other object, in which case the conditional branch point 1920 would not be necessary. The conditional branch point 1920 would be used, however, if floated objects were given special treatment (such as special highlighting for example).

§4.2.3.4 Managing Special Services

In the following, the processes related to the management or special services are described, with reference to FIG. 2D, in §4.2.3.4.1. Thereafter, techniques for performing an implicit query function are described in §4.2.3.4.2 and techniques for performing a proximity clustering function are described in §4.2.3.4.3.

§4.2.3.4.1 Processes for Managing Special Services

Having described the stored state information 240, as well as the processes related to the input management process 220, the processes related to the special services management process 250 are now described.

If the user interface of the present invention is to help a user to find objects related to an "active" object, the special services management process 250 invokes the implicit query process (or more generally, an "object matcher") 252, which may use matching (e.g., correlation or similarity) algorithms or heuristics, based on stored topic, or keywords, or contents of the object, or which may use predetermined object clusters, (See, e.g., field 704 of record 700.) stored in storage means 254, to determine objects related to the "active" objects. The "object matcher" can also use properties of the object that are not, strictly speaking, "contents of the object" but could be metadata such as age, size, usage pattern, etc. These characteristics, or properties of the object might be stored in an external fashion (therefore not "contents", but could still be used as the key by which the "object matcher" computes inter-object similarity. A co-occurrence method and a content-based method, each of which may be used by the implicit query process, are briefly introduced here.

The first technique is derived from a page-to-page co-occurrence matrix based on a number (e.g., seven) of previous users' categorizations. Thus a pair of pages may match anywhere between 0 and n (e.g., seven) times, where n is the number of previous users' categorizations. This technique essentially tells the user, "Other people thought these pages were related." For the content-based similarity technique, the known feature vector space model from information retrieval may be used. Objects may be pre-processed to remove the HTML markup. Words on a standard stop list of common words along with web-specific words may be omitted, and white space or punctuation may be used to delimit words. Phrases may also be used. Each object may be represented as a vector of words (and/or phrases) with entries representing the frequency of occurrence of a word (or a phrase) in that object. The similarity between objects may be measured by taking the "cosine distance" between the two object vectors—that is, the dot product of the vectors divided by the lengths of the objects. Objects may be considered to be "related" if the degree to which they match exceeds a match threshold stored in field 340. The display may render a control object, such as a slider for example, for permitting the user to vary the match threshold and see the objects found to be "related" to an active object.

Alternatively, a filtering or sorting process may be used to determine objects related based on a property, such as size, creation date, last used date, directory location, etc., of the objects. Such related objects may be visually highlighted to the user, by providing a colored halo around such objects which matches a colored halo around the "active" object for example. Alternatively, the halo of related objects may use a different color, or a different shade of the same color, to distinguish them from the "active" object.

The degree to which objects match, as determined by the implicit query process 252, may also be depicted. Implicit query processing and match indication may be carried out as described in U.S. patent application Ser. Nos. 09/152,713 and 09/152,525, entitled, "Methods, Apparatus, and Data Structures for Providing a User Interface which Exploits Spatial Memory in Three Dimensions, to Objects and which Visually Groups Matching Objects" and "Methods, Apparatus, and Data Structures for Providing a User Interface, which Exploits Spatial Memory, to Objects", respectively, both filed on Sep. 14, 1998 (each of which is incorporated by reference).

Figure 2E:
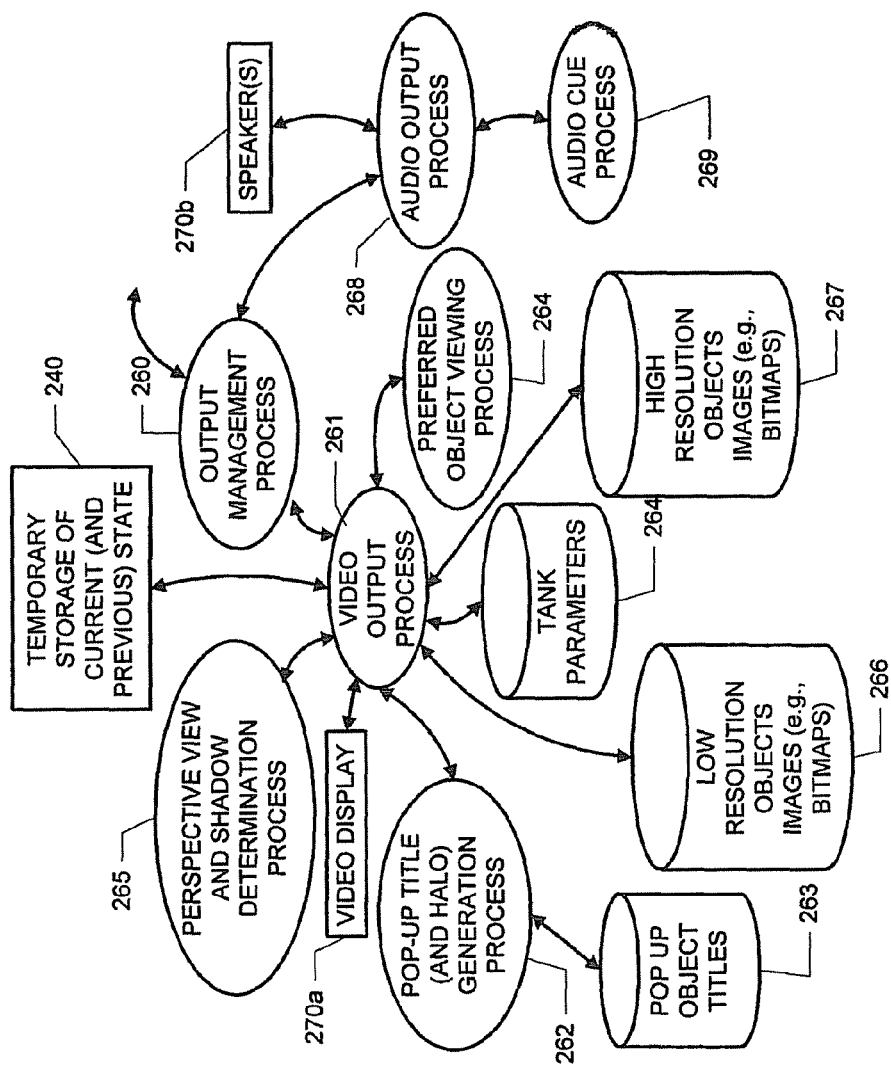
Figure 2D:
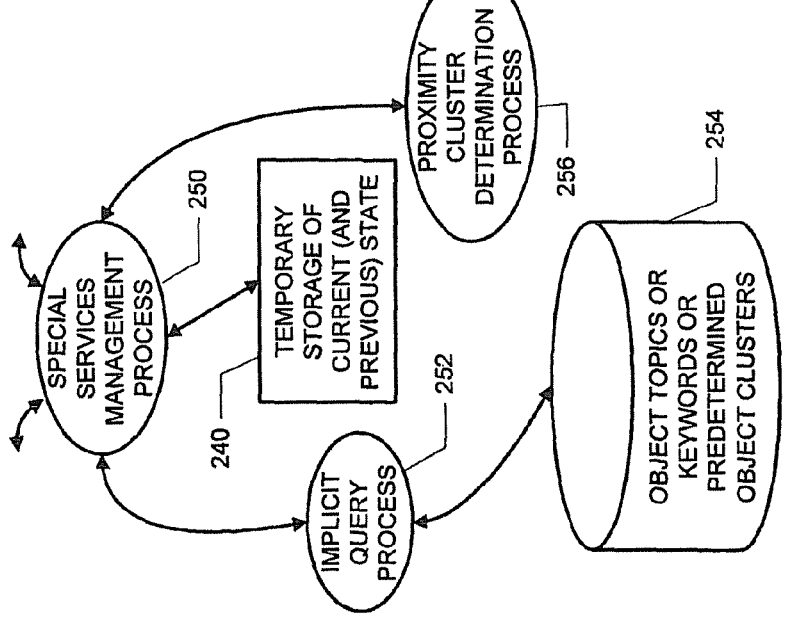

Referring still to FIG. 2D, to provide further help to the user, it may be assumed that users will position related objects in close proximity. The special services management process 250 may invoke a proximity cluster determination process (or more generally, a "proximity clustering facility") 256 to cluster object thumbnails based on proximity. Proximal clustering processing and cluster indication may be carried out as described in U.S. patent application Ser. Nos. 09/152,712 and 09/152,525, entitled, "Methods, Apparatus, and Data Structures for Providing a User Interface, which Exploits Spatial Memory in Three Dimensions, to Objects and which Visually Groups Proximally Located Objects" and "Methods, Apparatus, and Data Structures for Providing a User Interface which Exploits Spatial Memory, to Objects" respectively, both filed on Sep. 14, 1998 (each of which is incorporated by reference). As was the case with the various object occlusion avoidance techniques, the proximity cluster determination process may consider only those objects at the same depth level as the active object, objects within a predetermined number of depth levels of the active object, or without regard to the depth levels of the objects.

§4.2.3.5 Managing Outputs

In the following, processes which may be used to facilitate managing outputs in the user interface of the present invention are described, with reference to FIG. 2E, in §4.2.3.5.1. Then, exemplary methods for effecting such processes are described, with reference to FIG. 2I, in §4.2.3.5.2.

§4.2.3.5.1 Processes for Managing Outputs

Having discussed processes related to the input management process 220, the state update management process 230, and the special services management process 250, processes related to the output management process 260 are now described below with reference to FIG. 2E. Basically, the output management process 260 manages a video output process 261 and an audio output process 268. Each is described below.

The video output process (or more generally, a "video output facility") 261 uses parameters of the "data tank" 264 to render it on a video monitor 270*a*. Recall that the tank parameter may include a value in a tank contents field 328 of FIG. 3. For each object, the video output process 261 obtains the location and depth information in fields 308 of the temporary storage means 240, and the low resolution images in fields 404 of the object records 400 at storage means 266 to render the object thumbnails in the data tank at the appropriate position and at the appropriate depth.

If an object is "active", the output management process invokes the pop-up title bar generation process (or more generally, a "pop-up bar facility") 262 which accesses title (or other descriptive) information stored in fields 606 of records 600 stored in storage means 263. This title (or other descriptive) information is provided to the video output process 261 so that a pop-up title bar may be rendered. A colored halo may also be rendered around an active object.

If an object is "selected", a preferred object viewing process (or more generally, a "preferred object viewer") 264 is invoked by the video output process 261. The preferred object viewing process 261 moves the object thumbnail associated with the "selected" object to a preferred viewing location on the display. A "selected" object may be rendered in the center of display as an enlarged image. The low resolution image of the object may be replaced with the high resolution image of the object. Also recall that the thumbnail may display alternative representations of the content from a given object such as schematic or iconic views. To facilitate consistency of the user interface to the user, a movement animation may be used and may last about one second. During this enlargement, a natural transition via hardware or software supported blending may also be supported. The moved object thumbnail may, alternatively, be the actual object "live" on an associated application, such as an HTML page on an Internet browser, a text document on a word processor, a spreadsheet on an accounting application, etc. Also recall that the object thumbnail may display alternative representations of the object, such as iconic or schematic views. During a movement to the actual object, "live" in its associated application, a transition animation may employ blending or morphing.

Figure 8:
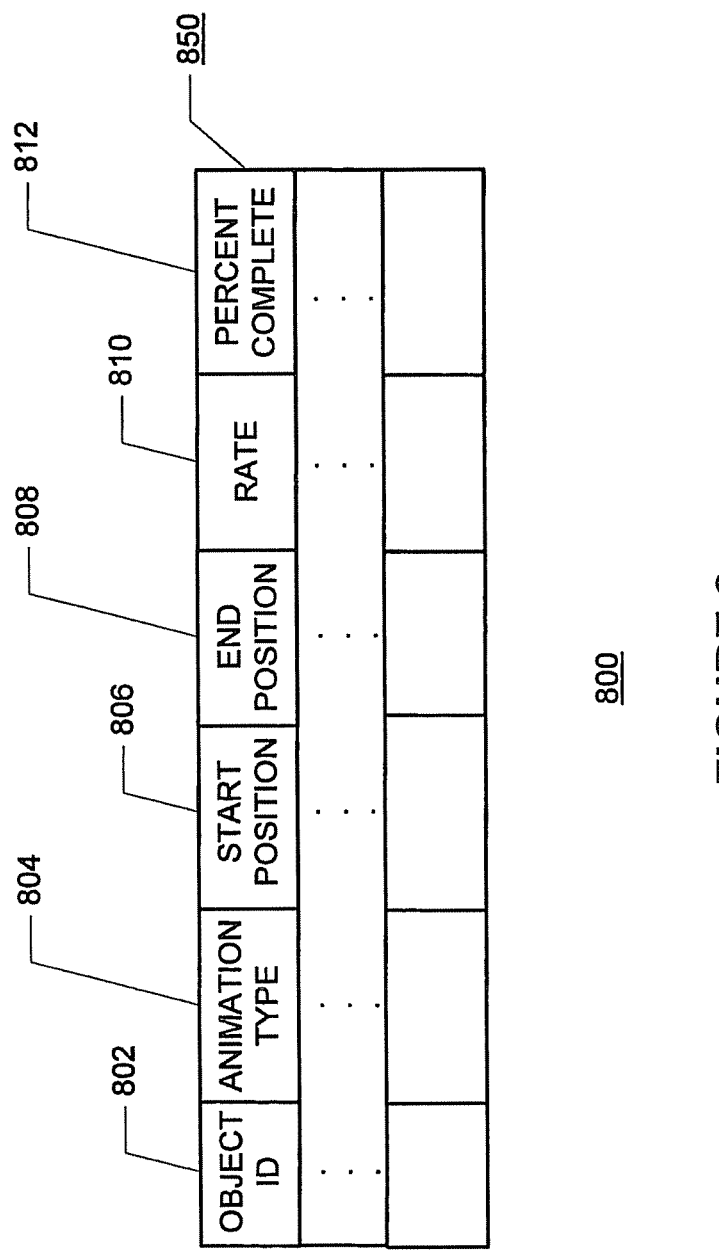
FIG. 8 is an exemplary data structure for storing animations which may be used by the present invention.

Referring to FIG. 8, each object has an animation record 850, which may be stored collectively as animation files 800. Each animation record 850 may include a field 802 for identifying the object, a field 804 for defining an animation type (e.g., morph, blend, enlarge, shrink, etc.), a field 806 for defining a start position (e.g., the object's location), a field 808 for defining an end position (e.g., the center foreground), a field 810 for defining the rate of the animation (e.g., total time=1 second), and a field 812 for tracking the percent complete (i.e., a current state) of the animation.

Finally, the video output process 261 may invoke a perspective view and shadow determination process 265 to render the object thumbnails to simulate a perspective view in three-dimensions such that the perceived sizes of the thumbnails are different since they are rendered from the perspective of the viewing point and to cast a simulated shadow on the floor 912 of the data tank.

Having described the processes associated with the video output process 261, a process associated with an audio output process 268 is now described. Still referring now to FIG. 2E, an audio cue process (or more generally, an "audio cue player") 269 which may be used to render stored audio data (not shown) based on the state(s) of object(s). For example, when an object is "activated", an associated audio cue may be played. This may be an abstract percussive "pong" sound. When an object is "floated", an associated audio cue may be played. This may be a gentle "bubbling" sound. When an object is "selected", the movement animation may be accompanied by an associated audio cue. This may be an abstract "whoosh" sound of increasing pitch and loudness in which the parameters of a flanger effect are changed over the duration of the sound. When a "selected" object is deselected, an animation, moving the object away from the user so that it appears smaller, may be accompanied by an associated audio cue. This may be a reversed version of the "whoosh" sound. When an object is being "moved", an associated audio cue may be played. This may be an oscillating electronic hum. The pitch of the oscillating hum may vary with the speed at which the object thumbnail is being moved. Left/right (or up/down) balance of the audio may be varied based on the relative position of the object on the screen. When an object is initially "moving", a mechanical latching sound cue may be played. When the object transitions out of a "moving" state, a mechanical unlatching sound cue may be played. When an object is being "pushed", an associated audio cue (e.g., based on a shuffling card sound) may be played.

Although the processes discussed above were described as being associated with input, state update, special services, and output management processes, as is apparent to those skilled in the art, certain of the operations can be combined or can be separated out.

§4.2.3.5.2 Exemplary Methods for Managing Outputs

Figure 21:
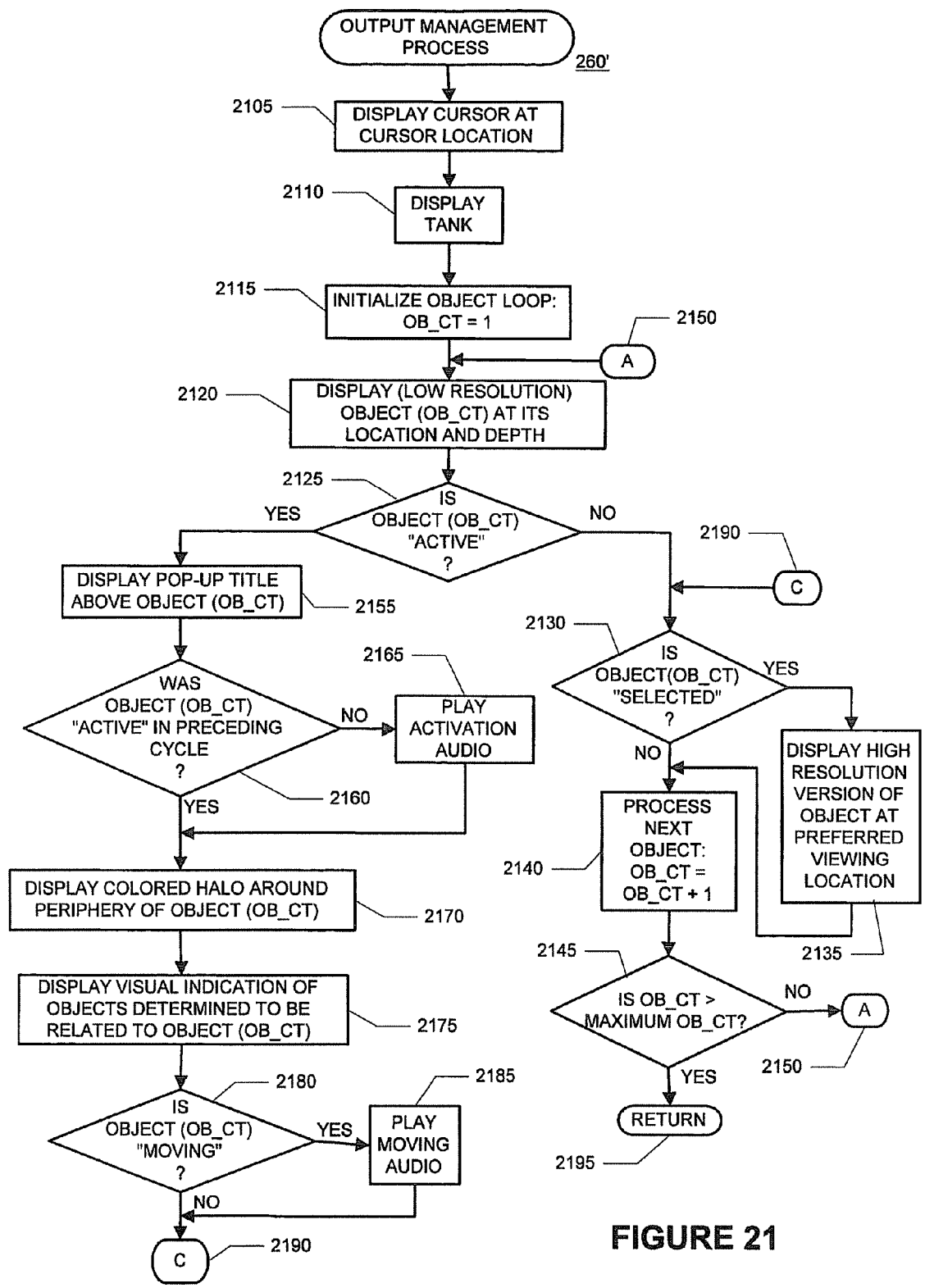
FIG. 21 is a flow diagram of an exemplary method for performing an output management process.

Recall from FIG. 13 that the animation loop process 1300 includes a act 260'/1350 of rendering a display and generating audio based on updated states. FIG. 21 is a flow diagram of an exemplary method 260' for performing an output management process for generating an audio and video output. First, as shown in act 2105, the cursor is displayed at its location. (Recall cursor location determination process 237, cursor location field 324, and video output process 261.) Next, as shown in act 2110, the data tank is rendered. (Recall storage means 264, video output process 261, and display 270a.) Next, a loop in which all objects are processed is run.

The object loop is initialized at act 2115 by initializing an object count value (OB_CT=1). Next, in act 2120, the object (thumbnail) is displayed anchored at its location, at its depth level. Processing continues at conditional branch point 2125 where it is determined whether or not the object being processed is "active". (Recall field 312.)

If the object is not active, processing branches to conditional branch point 2130 where it is determined whether the object being processed is "selected". (Recall field 314.) If so, a high resolution version of the moved object thumbnail is ultimately displayed at the preferred viewing location, as shown in act 2135, by progressing through the animation associated with the object (unless the animation is 100 percent complete). Recall that, in an alternative embodiment, a "live" object may be loaded into an associated application and then displayed. If the object being processed underwent a "not selected" to "selected" transition, the movement animation and associated audio cue may be played. To determine transitions, the object's previous state may be used.

From act 2135, or directly from conditional branch point 2130 if the object being processed is not "selected", the object indexing count is incremented (OB_CT=OC_CT+1) at act 2140. Then, as shown in act 2145, if all of the objects have been processed (OB_CT>MAXIMUM OB_CT; Recall field 326.), then the process 260' is exited via return node 2195. If, on the other hand, more objects need to be processed, processing branches back, via node A 2150, to act 2120.

Returning to conditional branch point 2125, if the object being processed is "active", then processing branches to act 2155 in which a pop-up title bar is displayed over the object (thumbnail). Next, at conditional branch point 2160, it is determined whether the object being processed just transitioned to the "active" state from an inactive state. Recall that to determine transitions, the object's previous state may be used. If so, an activation audio cue is played as shown in act 2165. From act 2165, or from conditional branch point 2160 if the object was already "active", act 2170 is performed. In act 2170, a colored halo is displayed around the periphery of the object (thumbnail). Next, in act 2175 if other objects are found to match the active object to a predetermined degree (Recall match threshold 340.), visual indications of such a match (or non-match) are rendered. (Recall implicit query process 252.)

Next, as shown at conditional branch point 2180, if the object being processed is "moving" (Recall field 316.), associated audio is played as shown in act 2185. Recall also that transitions to and from the "moving" state may be accompanied by mechanical latching and unlatching, respectively, audio cues. From act 2185, or from conditional branch point 2180 if the object being processed is not "moving", processing continues via node C 2190 to act 2130 where processing is carried out as discussed above.

4.2.3.6 Structure for Performing Processes

In the context of the personal computing environment 100 of FIG. 1A, the processes discussed with reference to FIGS. 2A through 2E may be carried out by the following facilities. The pointer input process 214 may be performed, at least in part, by the pointer 142, the serial port interface 146 and program modules 137. All data may be stored on any of the storage or memory devices or may be received from a remote source. The video output process 270 may be performed, at least in part, by program modules 137, the video adapter 148, the graphics accelerator, and the video monitor 147. The audio output process 278 may be performed, at least in part, by program modules 137, the sound card 161 and the speaker(s) 162. All other process may be effected by program modules 137 and application programs 136 (which may be written in $C^{++}$) executed on the processing units 121.

§4.3 SUMMARY

As illustrated in the foregoing description, the present invention provides a user interface, and in particular a graphical user interface, to information or content (also referred to as an "object"). The present invention permits a user to view and organize all objects and to edit or otherwise work on a selected object by, for example, representing, graphically, objects or content with object thumbnail which can be added, moved, or deleted from a display rendered on a video monitor. The present invention may map one or more parameters of an object to a coordinate in a direction orthogonal to the surface. The present invention may use pop-up title bars for permitting a user to discern more about the object represented by the object thumbnail. The present invention may use higher resolution image representations of objects, or "live" objects loaded within an associated application, for editing or otherwise working on a selected object.

The user interface of the present invention exploits spatial memory by, for example, providing two-dimensional layers on which the object thumbnails may be manipulated.

The user interface of the present invention is intuitive and minimizes the time needed for a user to become familiar with it. The user interface of the present invention is neither cumbersome, nor does it require too many different types of inputs to manipulate the object thumbnails. For example, the present invention may use inputs from a familiar input device such as a mouse or pointer to manipulate the object thumbnails. The present invention may also prevent one object thumbnail from totally occluding another so that neither is (totally) hidden from the user.

Finally, the user interface of the present invention can provide intelligent help to the user. For example, the present invention may cluster, by rendering a visual boundary for example, object thumbnails which are arranged, by the user, relatively close to one another. Further, the present invention may employ a matching (e.g., correlation or similarity) algorithm to determine whether certain objects are related. Alternatively, objects may be related by an explicit selection or designation by a user. If so, the present invention may employ some type of visual indicator(s) of "matching" (or non-matching) objects. This visual indication may be rendered upon an event, such as when an object thumbnail is activated.

Thus, the present invention represents an advance in the area of user interfaces.

What is claimed is:

1. A man-machine interface method for permitting a user to act on thumbnails, each thumbnail representing an associated object containing information, for use with a machine having a video display device and a user input device, the man-machine interface method comprising:
   generating a three-dimensional environment to be rendered on the video display device, the three-dimensional environment comprising an object manipulation and display field having surfaces including a bottom, a transparent front wall, a rear wall and side walls;
   determining a two-dimensional location and a depth of each of the thumbnails in the three-dimensional environment, wherein, for each of the thumbnails:
      the depth is a function of at least one parameter of the object associated with the thumbnail; and
      the two-dimensional location and the depth is determined that prevents total occlusion of the thumbnail by one or more other of the thumbnails in the three-dimensional environment;
   generating the thumbnails within the three-dimensional environment, at the determined two-dimensional locations and depths, to be rendered on the video display device;
   accepting inputs from the user input device;
   determining a selected viewing point, two-dimensional location, depth and direction based on the accepted inputs; and
   generating, as visible, a portion of the three-dimensional environment and those thumbnails that are in front of the selected viewing point to be rendered on the video display device, wherein those thumbnails that are in back of the selected viewing point are not visible and cast corresponding shadows on the at least one of the surfaces.

2. The man-machine interface method of claim 1 wherein, for each of the thumbnails, the depth is at least one of a linear function, a polynomial function or an exponential function of at least one parameter of the object associated with the thumbnail.

3. The method of claim 1 wherein the at least one parameter includes at least one parameter selected from a group of parameters consisting of click history, age, time since last use, size, file type, associated application, classification, and author.

4. The man-machine interface method of claim 1 further comprising:
   accepting inputs from the user input device;
   determining a two-dimensional cursor location based on the accepted inputs; and
   generating a cursor at the determined two-dimensional cursor location, to be rendered on the video display device.

5. The man-machine interface method of claim 4 further comprising:
   if the two-dimensional location of the cursor is located on or over one of the thumbnails, defining a state of that thumbnail as active.

6. The man-machine interface method of claim 5 further comprising:
   generating a pop-up information bar located over the active thumbnail, to be rendered on the video display device.

7. The man-machine interface method of claim 5 further comprising:
   wherein the user input provides a selection input and an active or floated thumbnail exists, then generating a higher resolution visual representation of the object represented by and associated with the active or floated thumbnail, at a preferred viewing location at a foreground of the three dimensional environment, to be rendered on the video display device.

8. The man-machine interface method of claim 7, wherein the act of generating the higher resolution visual representation of the object represented by and associated with the active thumbnail includes:
   generating an animation which moves the higher resolution visual representation of the object represented by and associated with the active thumbnail from the location of the active thumbnail to the preferred viewing location at the foreground of the three dimensional environment, to be rendered on the video display device.

9. The man-machine interface method of claim 8 further comprising:
if the user input provides a deselection input and if a selected thumbnail exists, then generating a video output for moving the high resolution visual representation of the object represented by and associated with the active thumbnail to the two-dimensional location of the selected thumbnail, to be rendered on the video display device.

10. The man-machine interface method of claim 7 further comprising:
if the user input provides a sink input and if a floated thumbnail exists, then setting the depth of the floated thumbnail to a previous value and defining a state of the floated thumbnail as active.

11. The man-machine interface method of claim 7, further comprising:
if the user input provides a selection input and if a floated thumbnail exists, then:
invoking an application related to the object represented by and associated with the floated thumbnail,
loading the object represented by and associated with the floated
thumbnail into the application, and
generating a video output of the application with the loaded object represented by and associated with the floated thumbnail at a preferred viewing location, to be rendered on the video display device.

12. The man-machine interface method of claim 5 further comprising:
if the user input provides a float input and if an active thumbnail exists, then setting the depth of the active thumbnail to a predetermined value and defining a state of the active thumbnail as floated.

13. The man-machine interface method of claim 5, further comprising:
if the user input provides a selection input and if an active thumbnail exists, then:
invoking an application related to the object represented by and associated with the active thumbnail,
loading the object represented by and associated with the active thumbnail into the application, and
generating a video output of the application with the loaded object represented by and associated with the active thumbnail at a preferred viewing location, to be rendered on the video display device.

14. The man-machine interface method of claim 5, further comprising:
if the user input provides a move input and if an active or floated thumbnail exists, then:
updating the two-dimensional location of the active or floated thumbnail based on the move input, wherein the move input includes a mouse drag.

15. The man-machine interface method of claim 1 wherein:
the three-dimensional environment defines a foreground and a background, and the act of generating thumbnails, within the three-dimensional environment, at the determined two-dimensional locations and depths, to be rendered on the video display device, includes:
using perspective view so that any thumbnails in the foreground defined by the three-dimensional environment appear larger than any thumbnails in the background defined by the three-dimensional surface.

16. The man-machine interface method of claim 15 wherein a thumbnail partially occludes any thumbnails behind it, based on a selected viewing point.

17. The man-machine interface method of claim 1, further comprising:
employing a matching algorithm for determining related thumbnails of the thumbnails; and
in response to selection of one of the related thumbnails, generating a visual halo that encompasses the related thumbnails to be rendered on the video display device.

18. The man-machine interface method of claim 17, wherein the determining the two-dimensional location and the depth of each of the thumbnails in the three-dimensional environment comprises clustering the related thumbnails together in the three-dimensional environment.

19. One or more volatile or nonvolatile memory devices storing computer-executable instructions that, when executed by one or more processors, configure the one or more processors to perform acts comprising:
generating a three-dimensional environment for rendering thumbnails on a video display device, the three-dimensional environment comprising surfaces that bound the three-dimensional environment;
determining a two-dimensional location and a depth of each of the thumbnails in the three-dimensional environment, wherein for each of the thumbnails:
the depth is a function of at least one parameter associated with the associated thumbnail; and
the two-dimensional location and the depth is determined that prevents total occlusion of the thumbnail by one or more other of the thumbnails in the three-dimensional environment;
employing a matching algorithm for determining related thumbnails of the thumbnails;
in response to selection of one of the related thumbnails, generating a visual halo that encompasses the related thumbnails for rendering on the video display device;
accepting inputs from the user input device;
determining a selected viewing point at a depth in the three-dimensional environment, a two-dimensional location of the selected viewing point and a viewing direction based on the accepted inputs; and
generating, as visible, a portion of the three-dimensional environment and those thumbnails that are in front of the selected viewing point to be rendered on the video display device, wherein those thumbnails that are in back of the selected viewing point are not visible and cast corresponding shadows on the at least one of the surfaces.

20. The one or more volatile or nonvolatile memory devices of claim 19 wherein, for each of the thumbnails, the depth is at least one of a linear function, a polynomial function or an exponential function of at least one parameter of an object associated with the thumbnail.

21. The one or more volatile or nonvolatile memory devices of claim 20, wherein the at least one parameter includes at least one parameter selected from a group of parameters consisting of click history, age, time since last use, size, file type, associated application, classification, and author.

22. An apparatus comprising:
one or more processors and memory having stored therein computer executable instructions, and the computer executable instructions upon execution by the one or more processors configuring the apparatus to perform acts comprising:
generating a three-dimensional environment for rendering thumbnails on a video display device, the three-dimensional environment comprising surfaces that bound the three-dimensional environment;

determining a two-dimensional location and a depth of each of the thumbnails in the three-dimensional environment, wherein for each of the thumbnails:
 the depth of the thumbnail is a function of at least one parameter associated with the thumbnail; and
 the two-dimensional location and the depth of the thumbnail is determined that prevents total occlusion of the thumbnail by one or more other of the thumbnails in the three-dimensional environment;

generating the thumbnails within the three-dimensional environment, at the determined two-dimensional locations and depths, to be rendered on the video display device;

accepting inputs from the user input device;

determining a selected viewing point at a depth in the three-dimensional environment, a two-dimensional location of the selected viewing point and a viewing direction based on the accepted inputs; and generating, as visible, a portion of the three-dimensional environment and those thumbnails that are in front of the selected viewing point to be rendered on the video display device, wherein those thumbnails that are in back of the selected viewing point are not visible and cast corresponding shadows on the at least one of the surfaces.

23. The apparatus of claim 22 wherein, for each of the thumbnails, the depth of the thumbnail is at least one of a linear function, a polynomial function or an exponential function of at least one parameter of an object associated with the thumbnail.

* * * * *